United States Patent
Winkler et al.

(10) Patent No.: US 12,281,659 B1
(45) Date of Patent: Apr. 22, 2025

(54) ACOUSTIC DAMPERS FOR LIFE SUPPORT SYSTEMS

(71) Applicant: Hamilton Sundstrand Corporation, Charlotte, NC (US)

(72) Inventors: Julian Winkler, Glastonbury, CT (US); Kenji Homma, Glastonbury, CT (US); Craig A. Reimann, Vernon, CT (US); Jeffrey M. Mendoza, Manchester, CT (US); Gregory Quinn, Windsor, CT (US); Hengyi Ju, Longmeadow, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/434,951

(22) Filed: Feb. 7, 2024

(51) Int. Cl.
*F04D 29/66* (2006.01)
*A62B 7/10* (2006.01)
*A62B 7/14* (2006.01)
*A62B 18/04* (2006.01)
*B64D 10/00* (2006.01)
(Continued)

(52) U.S. Cl.
CPC ............. *F04D 29/665* (2013.01); *A62B 7/10* (2013.01); *A62B 7/14* (2013.01); *A62B 18/045* (2013.01); *B64D 10/00* (2013.01); *B64G 6/00* (2013.01); *F02C 7/045* (2013.01); *F04D 29/663* (2013.01); *F04D 29/664* (2013.01); *B64D 2010/005* (2013.01)

(58) Field of Classification Search
CPC .... F04D 29/665; F04D 29/663; F04D 29/664; A62B 7/10; A62B 7/14; A62B 18/045; B64D 10/00; B64D 2010/005; B64G 6/00; F02C 7/045

USPC ..................................... 128/202.11; 415/119
See application file for complete search history.

(56) References Cited

U.S. PATENT DOCUMENTS 3,343,536 A * 9/1967 Brisson .................. B64D 10/00
62/259.3
3,345,641 A * 10/1967 Jennings ................... G21F 3/02
607/104
(Continued)

OTHER PUBLICATIONS

Paul et al (Development of a Fan for Future Space Suit Applications), Meeting: 40th International Conference on Environmental Systems, Publication Date Jan. 1, 2010 (Year: 2010).*

*Primary Examiner* — Brian Christopher Delrue
(74) *Attorney, Agent, or Firm* — CANTOR COLBURN LLP

(57) ABSTRACT

Life support systems include a pressure garment, a helmet, and a life support system enclosure that define an enclosed environment. The life support system includes one or more life support components to generate breathable gas within the enclosed environment. The gas is directed along a closed-loop flow path through the system. The life support components includes a fan for driving a flow of the gas through the closed-loop flow path and an acoustic damper arranged along the flow path and to reduce noise generated by the fan. The acoustic damper includes a housing defining an annular cavity arranged about a portion of the flow path, with the housing having a solid exterior surface and an inner diameter surface with openings to fluidly connect the flow path with the annular cavity and at least one acoustic damping element arranged within the annular cavity.

18 Claims, 18 Drawing Sheets

(51) Int. Cl.
 *B64G 6/00* (2006.01)
 *F02C 7/045* (2006.01)

(56) References Cited

U.S. PATENT DOCUMENTS

| | | | | |
|---|---|---|---|---|
| 3,635,216 | A * | 1/1972 | Curtis | B64G 6/00 607/104 |
| 5,318,018 | A * | 6/1994 | Puma | A62B 17/008 600/20 |
| 5,477,850 | A * | 12/1995 | Zegler | A62B 17/008 128/202.19 |
| 8,955,643 | B2 | 2/2015 | Liu | |
| 8,985,269 | B2 * | 3/2015 | Barre | B64C 1/40 181/258 |
| 9,061,243 | B2 * | 6/2015 | Nalette | B01J 35/613 |
| 11,761,411 | B2 * | 9/2023 | Kim | F02M 35/1272 118/212 |
| 11,804,206 | B2 | 10/2023 | Winkler et al. | |
| 11,830,467 | B2 * | 11/2023 | Reimann | G10K 11/168 |
| 12,047,196 | B2 * | 7/2024 | Woodman | H04L 12/40 |
| 2003/0085071 | A1 * | 5/2003 | Boast | F01N 13/18 181/255 |
| 2003/0122446 | A1 * | 7/2003 | Chen | A61C 15/00 310/309 |
| 2003/0150232 | A1 * | 8/2003 | Brudnicki | F25D 16/00 2/2.11 |
| 2007/0107982 | A1 * | 5/2007 | Sullivan | F01N 1/06 181/251 |
| 2007/0238835 | A1 * | 10/2007 | Chen | C08L 53/025 525/240 |
| 2011/0074067 | A1 * | 3/2011 | Khami | F02M 35/10104 264/513 |
| 2016/0040635 | A1 * | 2/2016 | Satarino | F16L 21/007 285/399 |
| 2017/0120085 | A1 * | 5/2017 | Givens | B01D 53/225 |
| 2021/0236983 | A1 * | 8/2021 | Junaedi | B01J 20/3458 |
| 2021/0299606 | A1 * | 9/2021 | Henson | B01D 53/229 |
| 2021/0315313 | A1 * | 10/2021 | Rohrig | B64G 6/00 |
| 2022/0040505 | A1 * | 2/2022 | Rohrig | B01D 53/0473 |
| 2022/0364514 | A1 * | 11/2022 | Winkler | F02K 1/827 |
| 2022/0366888 | A1 * | 11/2022 | Winkler | G10K 11/172 |
| 2022/0381209 | A1 * | 12/2022 | Kim | F02M 35/1272 |
| 2023/0179442 | A1 * | 6/2023 | Woodman | H04L 67/12 |
| 2023/0286639 | A1 * | 9/2023 | Mendoza | F02K 1/827 |
| 2024/0261707 | A1 * | 8/2024 | Ramon Mesa | B01D 19/0052 |

* cited by examiner

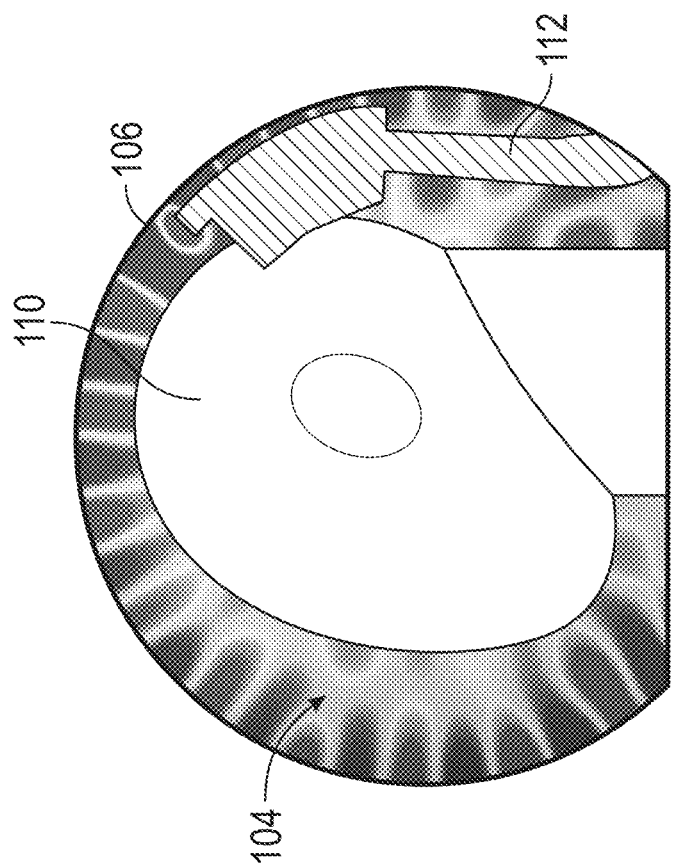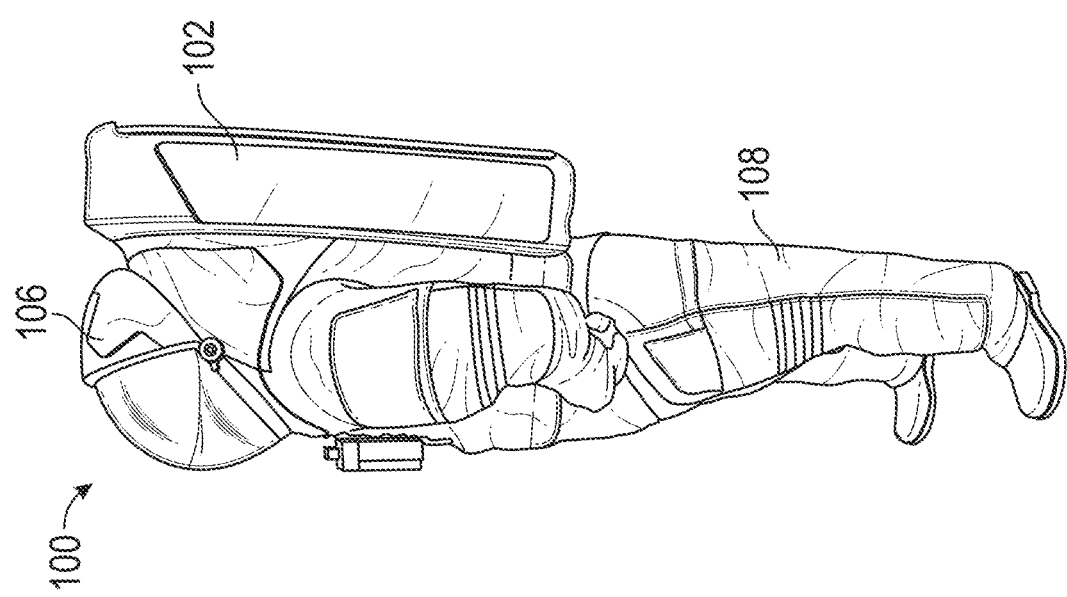
FIG. 1B
FIG. 1A

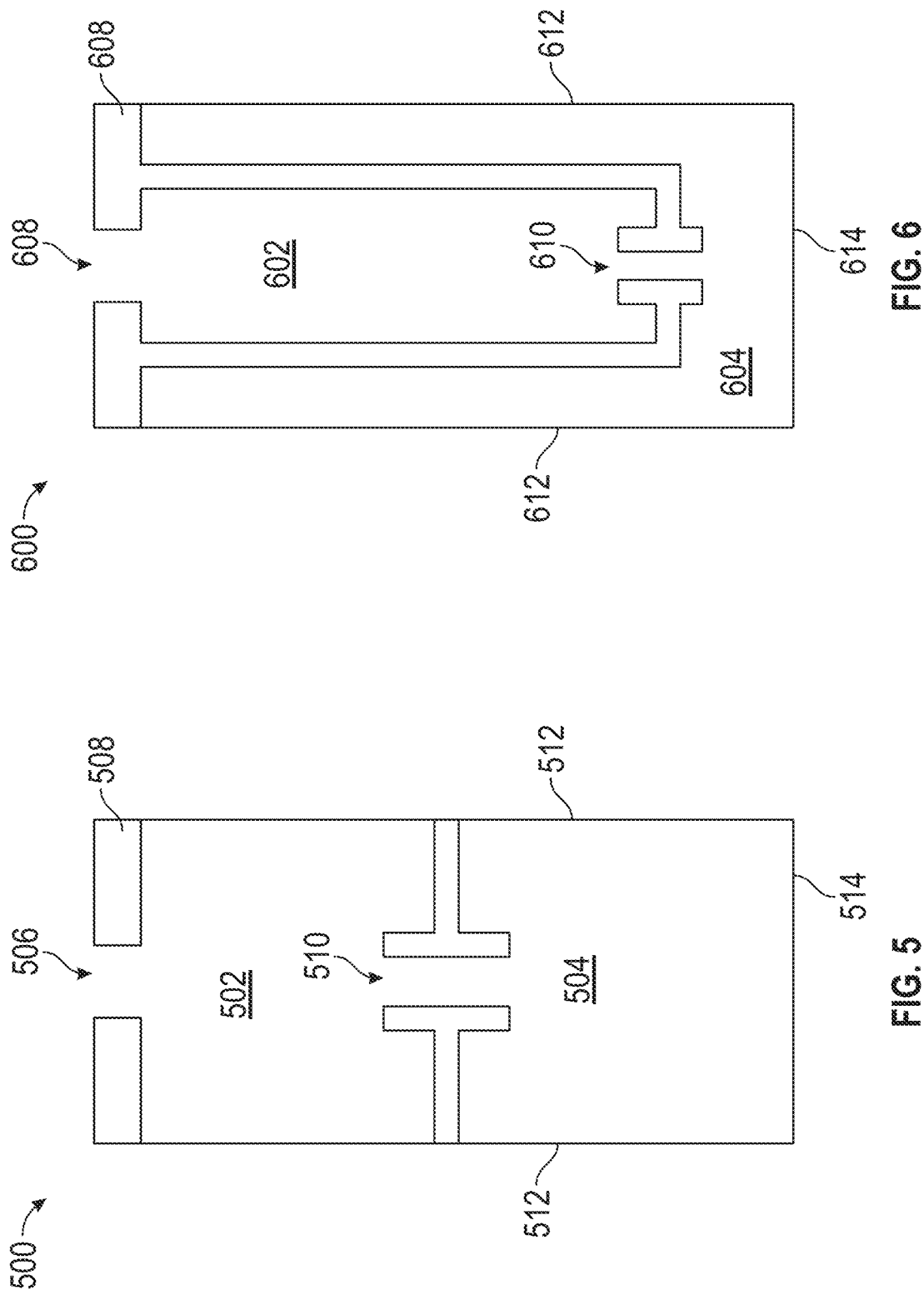

ACOUSTIC DAMPERS FOR LIFE SUPPORT SYSTEMS

BACKGROUND

The subject matter disclosed herein generally relates to personal or primary life support systems and, more particularly, to acoustic dampers and treatments for such life support systems.

Personal or primary life support systems, particularly for suits such as extravehicular suits for operations and procedures conducted in space, require a closed-loop system that supplies breathable gas to the user of the suit while also scrubbing harmful elements from the gas, such as carbon dioxide. Because the life support systems are closed loop, all components are included within the suit itself. As such, the components and devices used to cycle, clean, filter, and otherwise treat the enclosed environment within the suit are also contained within the suit. This results in an enclosure that includes the user (e.g., astronaut) and all electronic and/or mechanical components. These components make noise during operation, such as the use of a fan or other ventilation and/or life support systems. It is important to protect the hearing of the user, and thus noise reduction systems can provide benefits to life support systems, particularly for space applications.

SUMMARY

According to some embodiments, life support systems are provided. The life support systems include a pressure garment, a helmet, and a life support system enclosure. The pressure garment, the helmet, and the life support system enclosure define an enclosed environment. The life support system enclosure includes one or more life support components configured to provide gas for breathing within the enclosed environment. The gas is directed along a closed-loop cycle flow path through the helmet, the pressure garment, and the life support components. The life support components include a fan for driving a flow of the gas through the closed-loop cycle flow path and an acoustic damper arranged along the flow path and configured to reduce noise generated by the fan. The acoustic damper includes a housing defining an annular cavity arranged about a portion of the flow path, wherein the housing has a solid exterior surface and an inner diameter surface that comprises one or more openings to fluidly connect the flow path with the annular cavity and at least one acoustic damping element arranged within the annular cavity.

In addition to one or more of the features described herein, or as an alternative, further embodiments of the life support systems may include that the at least one acoustic damping element comprises at least one resonator acoustic damping element and at least one bulk absorber.

In addition to one or more of the features described herein, or as an alternative, further embodiments of the life support systems may include that the at least one resonator acoustic damping element comprises at least two resonator acoustic damping elements and the at least one bulk absorber comprises at least two bulk absorbers.

In addition to one or more of the features described herein, or as an alternative, further embodiments of the life support systems may include that the at least two resonator acoustic damping elements and the at least two bulk absorbers are arranged in an alternating pattern in an axial direction within the backing cavity.

In addition to one or more of the features described herein, or as an alternative, further embodiments of the life support systems may include that the at least one acoustic damping element comprises a bulk absorber.

In addition to one or more of the features described herein, or as an alternative, further embodiments of the life support systems may include that the bulk absorber comprises a foam or a gel material.

In addition to one or more of the features described herein, or as an alternative, further embodiments of the life support systems may include that the material of the bulk absorber comprises a varying density foam or varying density gel.

In addition to one or more of the features described herein, or as an alternative, further embodiments of the life support systems may include that the bulk absorber comprises a lattice structure.

In addition to one or more of the features described herein, or as an alternative, further embodiments of the life support systems may include that the lattice structure comprises a varying density lattice structure.

In addition to one or more of the features described herein, or as an alternative, further embodiments of the life support systems may include that the bulk absorber comprises a Triply Periodic Minimal Surface (TPMS) geometry structure.

In addition to one or more of the features described herein, or as an alternative, further embodiments of the life support systems may include that the at least one acoustic damping element comprises a resonator assembly arranged within the backing cavity.

In addition to one or more of the features described herein, or as an alternative, further embodiments of the life support systems may include that the resonator assembly comprises at least one first resonator acoustic damping element and at least one second resonator acoustic damping element having a different density than the at least one first resonator acoustic damping element.

In addition to one or more of the features described herein, or as an alternative, further embodiments of the life support systems may include that the resonator assembly comprises resonator housing, a first resonator chamber defined within a first resonator structure, a second resonator chamber defined within a second resonator structure, and a third resonator chamber defined within a volume of the resonator housing that is defined within the resonator housing between walls of the resonator housing and external surfaces of the first and second resonator structures.

In addition to one or more of the features described herein, or as an alternative, further embodiments of the life support systems may include that the at least one opening comprises a first opening fluidly connecting the flow path to the first resonator chamber and at least one second opening fluidly connecting the flow path to the third resonator chamber.

In addition to one or more of the features described herein, or as an alternative, further embodiments of the life support systems may include that the one or more openings comprise a first opening arranged to fluidly connect the flow path to a first part of the at least one acoustic damping element and a second opening arranged to fluidly connect the flow path to a second part of the at least one acoustic damping element.

In addition to one or more of the features described herein, or as an alternative, further embodiments of the life support systems may include that the at least one acoustic damping element is part of a set of acoustic damping structures arranged about the flow path within the backing cavity.

In addition to one or more of the features described herein, or as an alternative, further embodiments of the life support systems may include that the set of acoustic damping structures are arranged in annular rings about the flow path within the backing cavity.

In addition to one or more of the features described herein, or as an alternative, further embodiments of the life support systems may include that the set of acoustic damping structures are arranged with an orientation that extends at least partially in a flow direction of the gas through the flow path.

In addition to one or more of the features described herein, or as an alternative, further embodiments of the life support systems may include that the set of acoustic damping elements are arranged parallel to the flow direction of the gas through the flow path.

In addition to one or more of the features described herein, or as an alternative, further embodiments of the life support systems may include that the life support components comprise a rapid cycle amine (RCA) system, an acoustic damper, a heat exchanger, an ammonia scrubber, and a vent inlet plenum arranged along the flow path.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 1A is a schematic illustration of a suit having a life support system that may incorporate embodiments of the present disclosure;

FIG. 1B is a schematic illustration of noise that is present within a helmet of the life support system of FIG. 1A;

FIG. 5 is a schematic illustration of an alternative configuration of a resonator acoustic damping element in accordance with an embodiment of the present disclosure;

FIG. 6 is a schematic illustration of an alternative configuration of a resonator acoustic damping element in accordance with an embodiment of the present disclosure;

DETAILED DESCRIPTION

Figure 2:
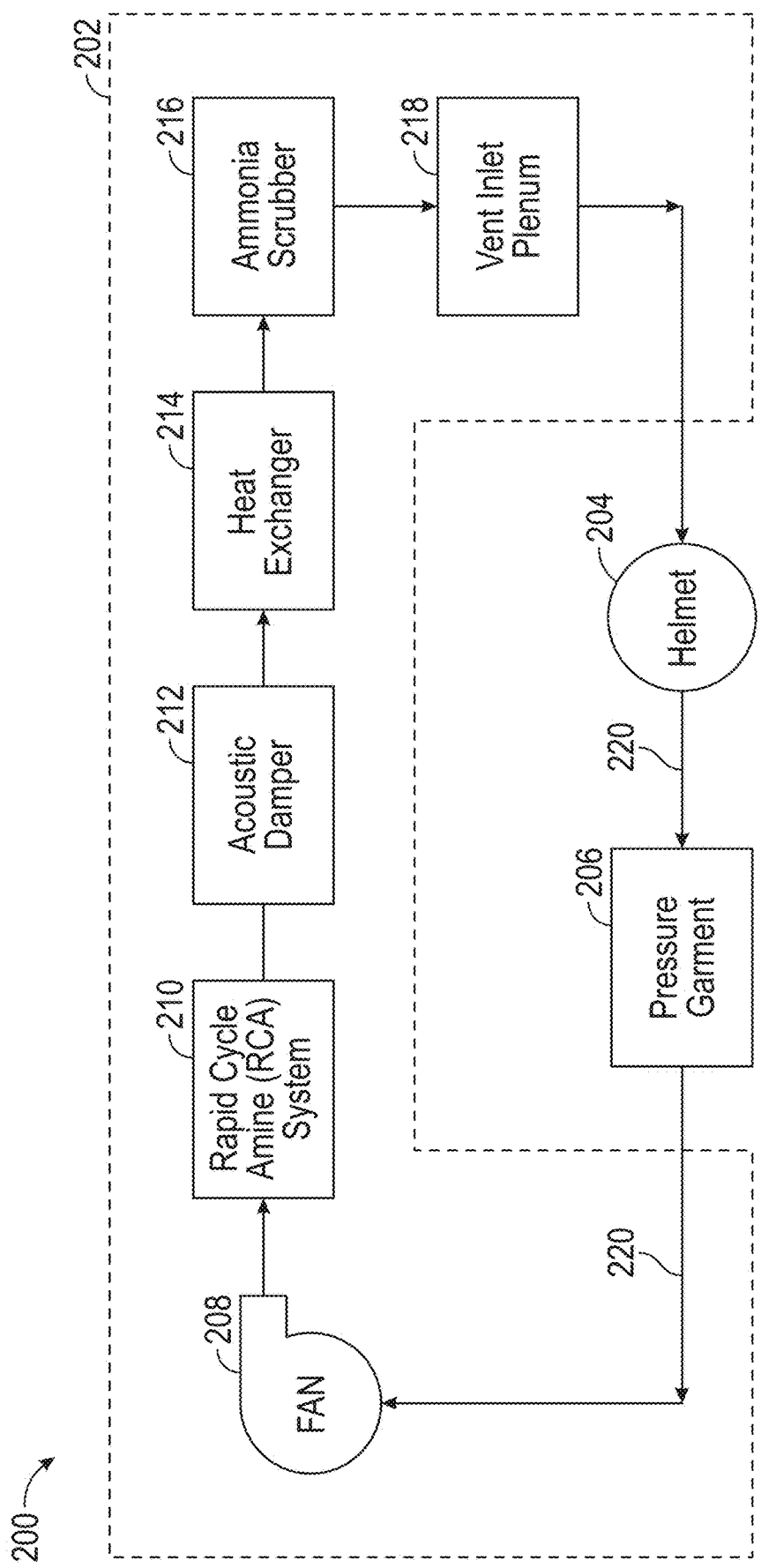
FIG. 2 is a schematic diagram of a life support system in accordance with an embodiment of the present disclosure.

As shown and described herein, various features of the disclosure will be presented. Various embodiments may have the same or similar features and thus the same or similar features may be labeled with similar reference numerals and/or description thereof may be omitted in certain later described embodiments for conciseness. Although similar reference numbers may be used in a generic sense, various embodiments will be described and various features may include changes, alterations, modifications, etc. as will be appreciated by those of skill in the art, whether explicitly described or otherwise would be appreciated by those of skill in the art. Further, it will be appreciated that, unless otherwise stated, features from the various separately described embodiments may be combined in various combinations and each embodiment is not intended to be mutually exclusive from features of other embodiments described herein and/or mutually exclusive from other features and components not explicitly described.

Referring to FIGS. 1A-1B, schematic illustrations of a life support system 100 having a life support system ("LSS") enclosure 102 integrated therewith are shown. FIG. 1A illustrates the life support system 100 and FIG. 1B illustrates sound waves 104 generated by the LSS enclosure 102 that are reflected within a helmet 106 of the life support system 100. The life support system 100 includes a pressure garment 108 which is worn by a user 110 and sealing connects with the helmet 106 and the LSS enclosure 102 to define an enclosed environment. The LSS enclosure 102, in this illustrative configuration, is arranged on the back of the pressure garment 108 and is worn as a backpack style arrangement. The LSS enclosure 102 includes various components, such as electrical and/or mechanical systems for providing life support functions, as described herein. The LSS enclosure 102, and the components thereof, is arranged within an exterior enclosure (e.g., outer pressure layer) of the life support system 100 such that the entire life support system 100 is enclosed and creates an internal environment for supporting the user 110 of the life support system 100. The components of the LSS enclosure 102 is configured to provide gas for breathing within the life support system 100 and thus includes various components to form a closed-loop cycle for providing breathable gas while removing unwanted components, such as carbon dioxide and the like. The breathable gas may be pure oxygen, a mixture of oxygen and other gases, or the like, as will be appreciated by those of skill in the art. As shown, the internal volume of the helmet 106 may be fluidly connected to the components within the LSS enclosure 102 through a fluid connection 112, such as tubing, piping, conduits, and the like.

The user 110 requires a supply of oxygen from the components within the LSS enclosure 102 to be provided into the helmet 106. This is particularly important during extravehicular missions, where the user 110 is operating within a vacuum or near-vacuum environment (e.g., space) and thus the life support system 100 provides the sole means of environmental protection to the user 110. Accordingly, the LSS enclosure 102 may be configured to provide various functions to ensure the safety of the user 102. For example, and without limitation, the life support system 100 and components of the LSS enclosure 102 thereof may be configured to regulate suit pressure; provide breathable oxygen; remove carbon dioxide, humidity, odors, and contaminants from breathing oxygen; cool and recirculate oxygen through the life support system 100; cool and recirculate water through the life support system 100; provide voice communication (e.g., two-way); display and/or monitor health parameters of the life support system 100 (e.g., pressure status, gas volumes, temperature, etc.) and/or the user 110 (e.g., health metrics such as heart rate, breathing, temperature, etc.).

One of the components in the LSS enclosure 102 is a fan that is used to drive circulating gas through the life support system 100. The fan provides ventilation gas and creates noise 104 that propagates through the closed-loop system to the helmet 106. The generated noise 104 is confined within the helmet 106, as illustratively shown in FIG. 1B, and the user 110 is exposed to the noise 104 at all times. Noise mitigation, in the form of an acoustic muffler or acoustic damper, can reduce the overall noise levels inside the helmet 106 and thereby improve comfort and meet noise requirements. Embodiments of the present disclosure are directed to life support systems that include such noise mitigation systems and configurations.

Referring now to FIG. 2, a schematic diagram of a life support system 200 in accordance with an embodiment of the present disclosure is shown. The life support system 200 includes an LSS enclosure 202, a helmet 204, and a pressure garment 206, which may be arranged as shown in FIG. 1A (e.g., arranged as a closed-system suit). The LSS enclosure 202, in combination with the helmet 204 and the pressure garment 206, is arranged to include all necessary components to provide life support for a user within the life support system 200. The LSS enclosure 202, the helmet 204, and the pressure garment 206 may define a sealed and enclosed environmental system that supports a user within the pressure garment 206 and helmet 204 (referred to herein as a "suit").

The LSS enclosure 202 of the life support system 200 includes various components for processing, treating, and supplying breathable gas to a user within the suit. The LSS enclosure 202 may be mounted to or within the pressure garment 206, such as shown in FIG. 1A. In this illustrative configuration, the LSS enclosure 202 includes a fan 208, a rapid cycle amine (RCA) system 210, an acoustic damper 212, a heat exchanger 214, an ammonia scrubber 216, and a vent inlet plenum 218. Each of these components may be housed within a housing or frame of the LSS enclosure 202. A flow path 220 fluidly connects each of the fan 208, the rapid cycle amine system 210, the acoustic damper 212, the heat exchanger 214, the ammonia scrubber 216, and the vent inlet plenum 218 in series. Downstream from the vent inlet plenum 218 is the helmet 204 into which treated gas (e.g., breathable gas) is supplied, and the gas is then directed into and through the pressure garment 206 before returning to the fan 208 within the LSS enclosure 202, and thereby define a closed-loop gas cycle. Although shown in a specific arrangement in series, those of skill in the art will appreciate that the components of the life support system 200 may be arranged in other sequence or order and/or may include various other types of components or exchange the illustrated components with similar functional elements, without departing from the scope of the present disclosure. That is, the illustrative configuration of FIG. 2 is intended to be for illustrative and explanatory purposes only and is not intended to be limiting.

In operation, the fan 208 will generate a motive force to push gas through the life support system 200. From the fan 208, the gas will be passed through various components along the flow path 220. The flow path 220 may be a series of tubing, conduits, pipes, or the like, which are arranged to carry and direct the gas through the treatment process of the life support system and then return the waste gas (exhalation from a user) back into the system for treatment. The components are configured to treat and condition the gas to ensure that breathable gas is supplied to a user of the life support system 200. For example, and as shown, the RCA system 210 may receive the gas to remove carbon dioxide and/or humidity from the gas stream. Downstream from the RCA system 210 is the acoustic damper 212, which will be described in more detail herein. From there, the gas is passed through the heat exchanger 214 for thermal conditioning of the gas and the ammonia scrubber 216 is provided to remove ammonia which may be toxic and/or be an irritant to the user. The vent inlet plenum 218 may be configured with a charcoal packed bed for additional conditioning of the gas stream prior to being supplied into the helmet 204 and the pressure garment 206, after which the gas is cycled back to the fan 208. The flow path 220 is a closed loop system which provides for a livable environment in which an operator or user may survive in harsh conditions, such as in the vacuum or near vacuum of space.

As noted above, noise can be of concern for users, which can be distracting to the user or potentially damaging to the ears of the user in certain instances. The noise within the life support system 200 may be generated by any electric, electronic, mechanical, and/or electromechanical components. The primary source of noise, however, may be the fan 208. The fan 208, may be a high-speed fan, which provides for ventilation gas and cycling of the gas stream through the flow path 220. A high-speed fan may be a fan having a rotational speed of 25,000 revolution per minute (RPM) or greater, and may be between 25,000 RPM and 75,000 RPM, and in some embodiments may be 40,000 RPM. The fan 208 will create noise that propagates through the closed-loop system (i.e., through the flow path 220 to the helmet 204), such as shown in FIG. 1B. The generated noise may be confined within the helmet 204, and the user (e.g., astronaut) will be exposed to the noise at all times. The components arranged along the flow path 220 will provide some attenuation of the sound. For example, the heat exchanger 214 may induce thermoviscous losses, the RCA system 210 may induce granular packed bed losses, and the vent inlet plenum 218 may induce losses associated with a charcoal packed bed. However, these attenuation impacts are mostly in higher frequency ranges, associated with the noted pressure losses. For example, and without limitation, such high frequency ranges may be greater than 2 kHz, may be between 2 kHz and 20 kHz, and in some embodiments may be 3 kHz or greater. Because the fan may also generate lower frequency noise, additional acoustic damping may be required to ensure acceptable noise levels within the helmet 204, the pressure garment 206, and/or the LSS enclosure 202.

For example, the fan 208 may generate noise in low- and mid-frequency ranges (e.g., 300 Hz to 10 kHz, with the lowest frequency being based on the RPM of the fan, and may be below 1 kHz). The fan-related tones that are generated by the fan 208 may be caused by blade-passage frequency, shaft speed, broadband noise generated from turbulent flow over the blades of the fan and/or turbulent/distorted inflow of gas into the fan, and other aspects of the fan and/or fan assembly. In accordance with embodiments of the present disclosure, noise mitigation, in form of the acoustic damper (e.g., a muffler or the like) arranged along the flow path 220, can reduce the overall noise levels inside the helmet 204 and thereby improve comfort and meet noise requirements. To address the low to mid-frequency range and fan-related tones, a resonator-type solution may be employed. Further, in accordance with some embodiments, a bulk absorber may be arranged in combination with the resonator-type configuration to broaden the range of damping. Because of the nature of the life support system 200 being carried on a person and as part of a closed-loop, sealed system, the acoustic treatment solutions at lower frequencies (large wavelengths) have to be compact and effective, due to space constraints. Accordingly, some embodiments of the present disclosure are directed toward ensuring desired noise damping over a broad spectrum of frequencies.

The acoustic damper 212 is arranged within the life support system 200 along the flow path 220. As noted above, the flow path 220 may be formed from tubing, piping, conduits, or the like, which are arranged to convey and direct a gas flow through the various components of the life support system 200. The acoustic damper 212 may be located at any position along the flow path 220, but in this illustrative embodiment is arranged between the RCA system 210 and the heat exchanger 214. In other embodiments, the acoustic damper 212 may be arranged between any two other components along the flow path 220. Furthermore, although shown with a single acoustic damper 212 in the life support system 200, it will be appreciated that multiple acoustic dampers 212 may be arranged throughout the life support system 200. For example, in some embodiments, a first acoustic damper 212 may be arranged as shown, and a second acoustic damper may be arranged between the vent inlet plenum 218 and the helmet 204. One or more additional acoustic dampers may also be arranged at various locations along the flow path 220. In some configurations, when multiple acoustic dampers are provided, at least two of the acoustic dampers may be different from each other to ensure, for example, damping of different ranges of frequencies in the system.

The acoustic damper 212 may be arranged as a modification of a portion of the flow path 220, such as a modification of a section of piping along the flow path 220. The acoustic damper 212 may be integrally formed with the intended section of piping (e.g., additive manufacturing) or may be installed through various manufacturing and assembly processes.

Figure 3A:
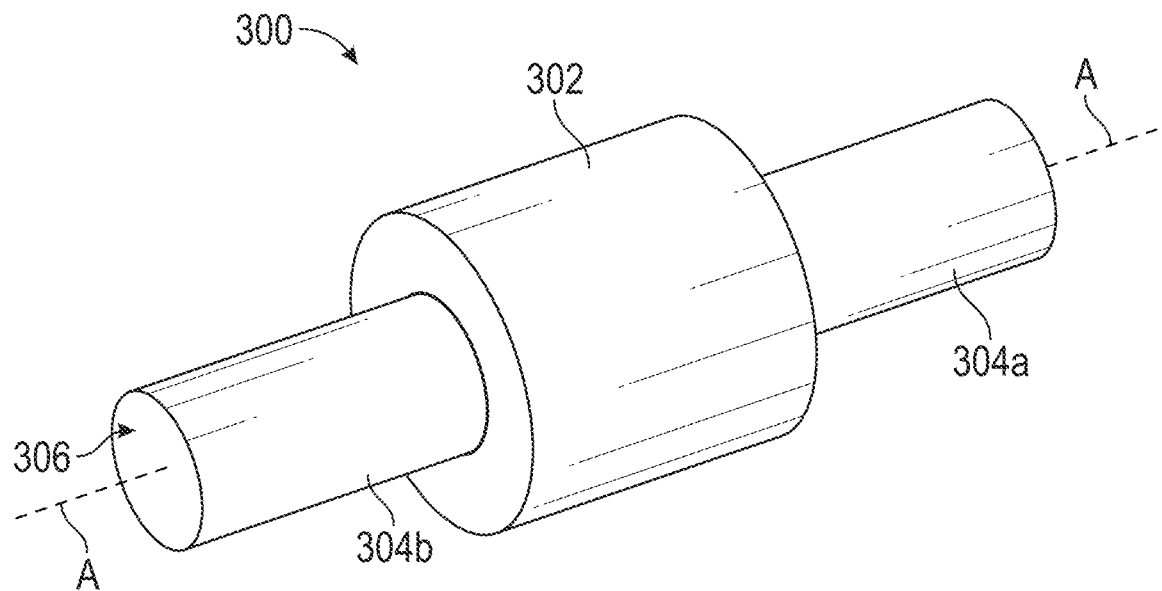
FIG. 3A is a schematic illustration of an acoustic damper for use with a life support system, in accordance with an embodiment of the present disclosure.
Figure 3B:
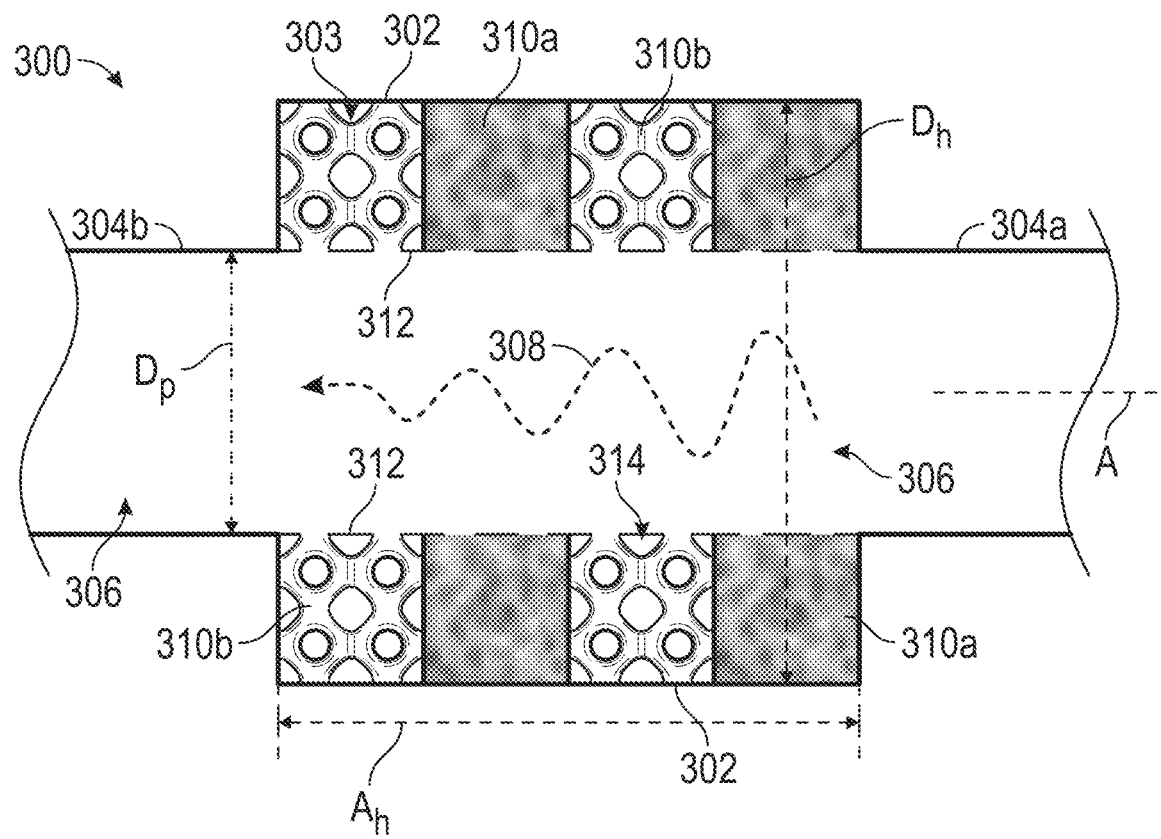
FIG. 3B is a schematic cross-sectional illustration of an internal structure of the acoustic damper of FIG. 3A.
Figure 3C:
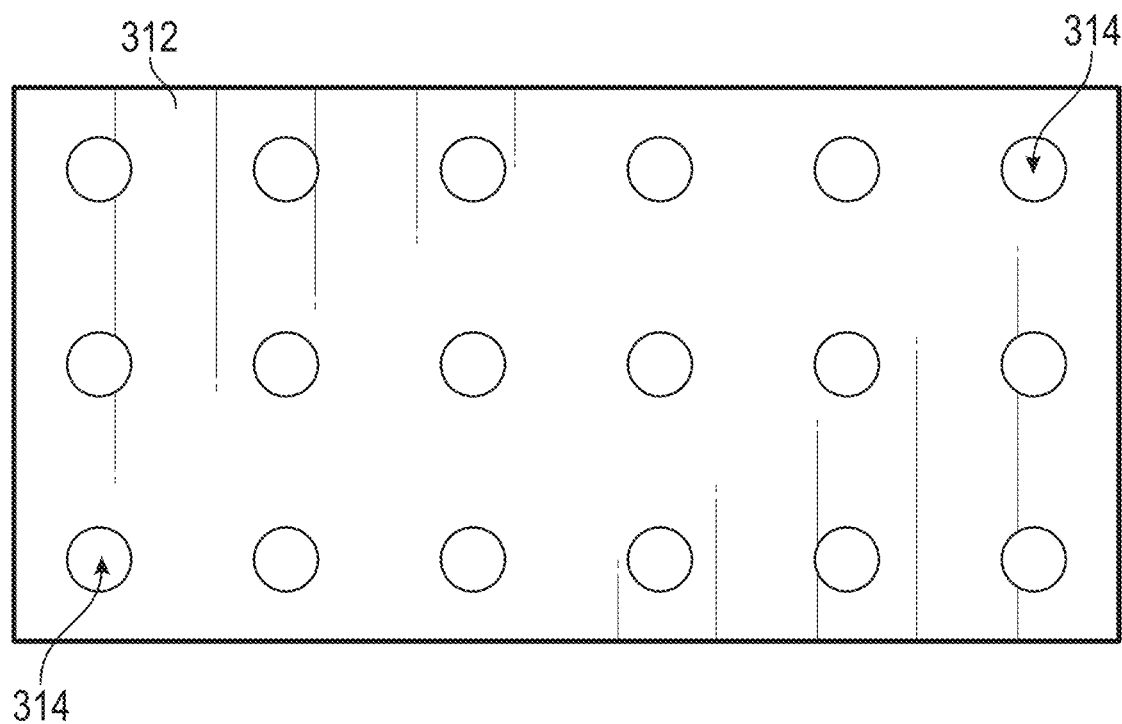
FIG. 3C is a plan view illustration of an inner diameter surface of the acoustic damper of FIG. 3A.

Referring now to FIGS. 3A-3C, schematic illustrations of an acoustic damper 300 in accordance with an embodiment of the present disclosure are shown. The acoustic damper 300 may be integrated into a life support system, such as shown and described above, and may be representative of one configuration of the acoustic damper 212 shown in FIG. 2. FIG. 3A is an isometric view of the acoustic damper 300, FIG. 3B is a cross-sectional view illustrating the internal structure thereof, and FIG. 3C is a plan view of an internal feature of the acoustic damper 300.

As shown in FIG. 3A, the acoustic damper 300 includes a housing 302 arranged along a section of pipe having an inlet section 304a and an outlet section 304b. As used herein, the pipe may be generally referred to as pipe 304. Gas and sound flows through the acoustic damper 300 from the inlet section 304a, through the housing 302, and out through the outlet section 304b and then to downstream components, such as shown and described above. The interior of the inlet section 304a, the housing 302, and the outlet section 304b may define a flow path 306, which may be substantially open and unobstructed along an axis A through the flow path 306 (and defined by a central axis of the pipe 304 and housing 302). As shown in FIG. 3B, a sound wave 308 may propagate through the flow path 306.

The acoustic damper 300 provides acoustic damping of the sound waves 308 by including structures within the housing 302 that may be selected to damp or otherwise absorb at least a portion of the sound waves 308. The housing 302 may be substantially continuous in surface with the exterior surfaces/walls of the pipe 304 such that no leakage of gas occurs. As noted, the acoustic damper 300 may be arranged on piping of a closed-cycle, life support system, such as shown and described above, and thus prevention of loss of gas is important. Accordingly, the acoustic damper 300 is integrated into the section of pipe between the inlet portion 304a and the outlet portion 304b in a substantially sealed and continuous manner. The housing 302 may define a backing cavity 303 for receiving acoustic treatment elements and/or material.

For example, as shown in FIG. 3B, the housing 302 of the acoustic damper 300 houses and contains one or more acoustic damping elements 310a, 310b (collectively acoustic damping elements 310) within the backing cavity 303. The acoustic damping elements 310 may be arranged to receive a portion of the gas and sound waves 308 as they pass through the housing 302. The acoustic damping elements 310 may be annular in geometry and fill the backing cavity 303 in a ring-like structure about the inner diameter surface 312. In the cross-sectional view of FIG. 3B, the acoustic damping elements 310 are shown in cross-sectional profile illustrating the radial extend or span of the acoustic damping elements 310. However, it will be appreciated that the acoustic damping elements 310 wrap about the entire circumferential structure of the housing 302 (e.g., as shown in FIG. 3A).

The acoustic damping elements 310a, 310b may be acoustic damping treatments that are arranged within the backing cavity 303 of the housing 302 and arranged to receive and absorb or otherwise reduce the amplitude of the sound waves 308. In this illustrative embodiment, there are two first acoustic damping elements 310a and two second acoustic damping elements 310b arranged in an alternating fashion. The first and second acoustic damping elements 310a, 310b may be different from each other to provide a specific acoustic damping scheme. For example, and without limitation, the first acoustic damping elements 310a may be absorbers (e.g., bulk absorbers) and the second acoustic damping elements 310b may be resonators (e.g., Helmholtz resonators). Such a configuration can provide for a tuned or frequency targeted acoustic damping. Although shown with a specific number and arrangement of acoustic damping elements 310, various other configurations are possible without departing from the scope of the present disclosure. For example, although two of each acoustic damping element 310a, 310b type is shown, it will be appreciated that each acoustic damping element 310 may be different from each other, with fewer or greater number of elements arranged with the housing 302, without departing from the scope of the present disclosure.

The housing 302 is arranged with a housing diameter Dh that is greater than a pipe diameter $D_p$ of the pipe 304. The housing 302 has an axial length $A_h$, along a flow direction. The volume $V_a$ of the acoustic damper 300 that contains the acoustic damping elements 310a, 310b (i.e., the backing cavity 303) is defined by:

$$V_a = \pi\left(\left(\frac{D_h}{2}\right)^2 - \left(\frac{D_p}{2}\right)^2\right) A_h.$$

The exterior surfaces of the housing 302 may be substantially continuous with the exterior surfaces of the pipe 304 such that an internal, enclosed flow path is defined. The damping elements 310a, 310b are arranged within the volume $V_a$ of the housing 302. Radially inward from the volume $V_a$ of the backing cavity 303 is a continuation of the flow path 306 which passes through the housing 302 such that the flow path 306 is not obstructed in the flow direction.

To permit the sound waves 308 to enter the housing 302 and interact with the acoustic damping elements 310a, 310b contained therein, an inner diameter surface 312 of the housing 302 includes openings 314 such as perforations, apertures, or the like. FIG. 3C illustrates a plan view illustration of a portion of the inner diameter surface 312 having the openings 314. In various configurations, each acoustic damping elements 310a, 310b may be associated with one or more openings 314. The relationship between the acoustic damping elements 310a, 310b and the openings 314 may be dependent, in part, upon the type of acoustic damping element implemented in the specific section or portion of the acoustic damper 300. In the case of a bulk absorber configuration, a plurality of openings 314 (e.g., set of perforations) may be provided on the inner diameter surface 312 such that portions of the sound waves 308 may distribute into the respective bulk absorbers. In the case of resonator-type configurations, each resonator of the acoustic damping element may have a single opening 314 associated therewith such that portions of the sound waves 308 will enter an individual resonator through a single opening 314. In other configurations, individual openings 314 may be associated with a bulk absorber and/or multiple openings 314 may be associated with resonators and/or the space around the resonators (e.g., into the space of the backing cavity not enclosed by a structure of a resonator).

The acoustic damper 300 is arranged as a pipe section of cross-section that is greater than the rest of the surrounding pipe (i.e., inlet section 304a and outlet section 304b). A radial extension of the material to form the housing 302, and thus increase the size of the pipe section, creates and defines the annular backing cavity 303 within the housing 302 between the inner diameter surface 312 and the rest of the housing 302. The inner diameter surface 312 has the same diameter as the pipe diameter $D_p$ and thus the flow path 306 is continuous through the acoustic damper 300. As shown in FIG. 3B, the annular backing cavity 303 defined by the housing 302 includes two resonator type acoustic damping elements 310b and two bulk absorber type acoustic damping elements 310a in an alternating layout along an axial direction. It will be appreciated that various other layout combinations, arrangements, type, and/or number of acoustic damping elements may be employed without departing from the scope of the present disclosure. The openings 314 formed on the inner diameter surface 312 of the housing 302 fluidly connects the annular backing cavity 303 having the acoustic damping elements 310a, 310b to the main flow path 306.

The backing cavity 303 includes sound attenuating structures that reduce the transmitted sound in the pipe section, in the form of the acoustic damping elements 310. In some configurations, resonators (e.g., acoustic damping elements 310b) in the backing cavity 303 may be tuned to absorb sound at or around one or more discrete frequencies. Accordingly, low-frequency to mid-frequency sound waves may be addressed and able to absorb fan blade passage sounds and/or other tones. Bulk absorber (e.g., acoustic damping elements 310a) may be arranged and provided to reduce high-frequency sound and broaden the response between the resonator tones provided by the acoustic damping elements 310b. The combination of resonator and bulk absorbers allows the acoustic treatment design to cover a wide frequency range for sound absorption.

Figure 4B:
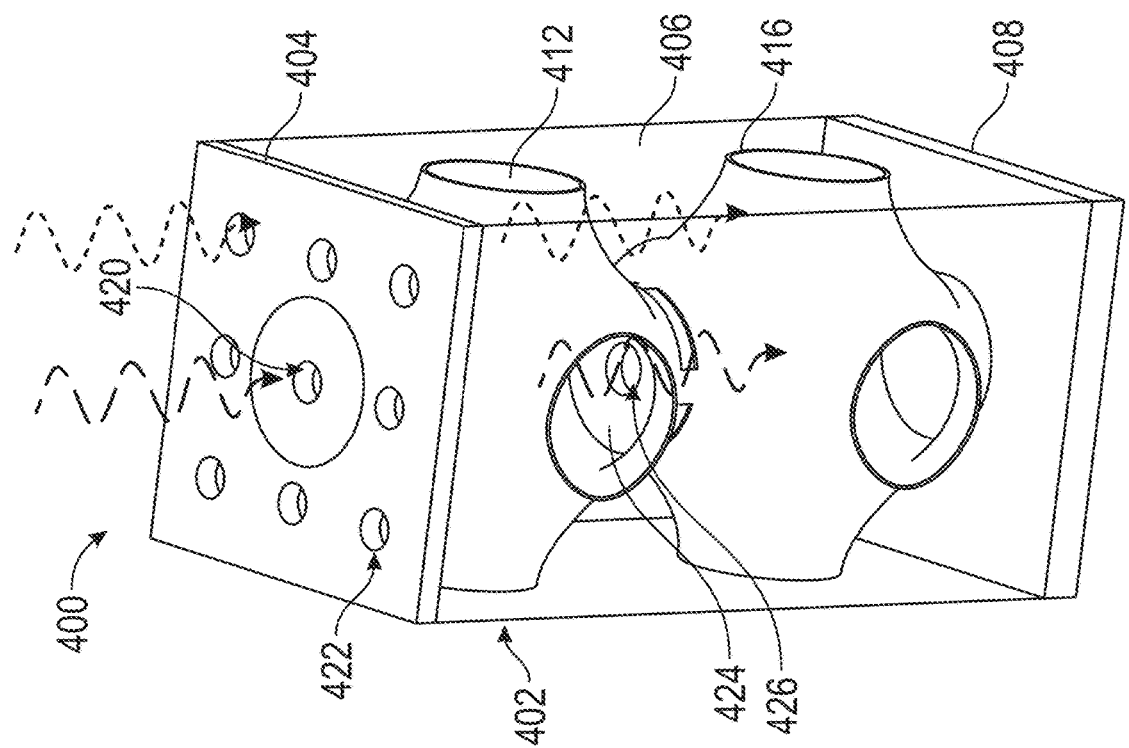
FIG. 4B is an isometric illustration of the resonator acoustic damping element of FIG. 4A.
Figure 4A:
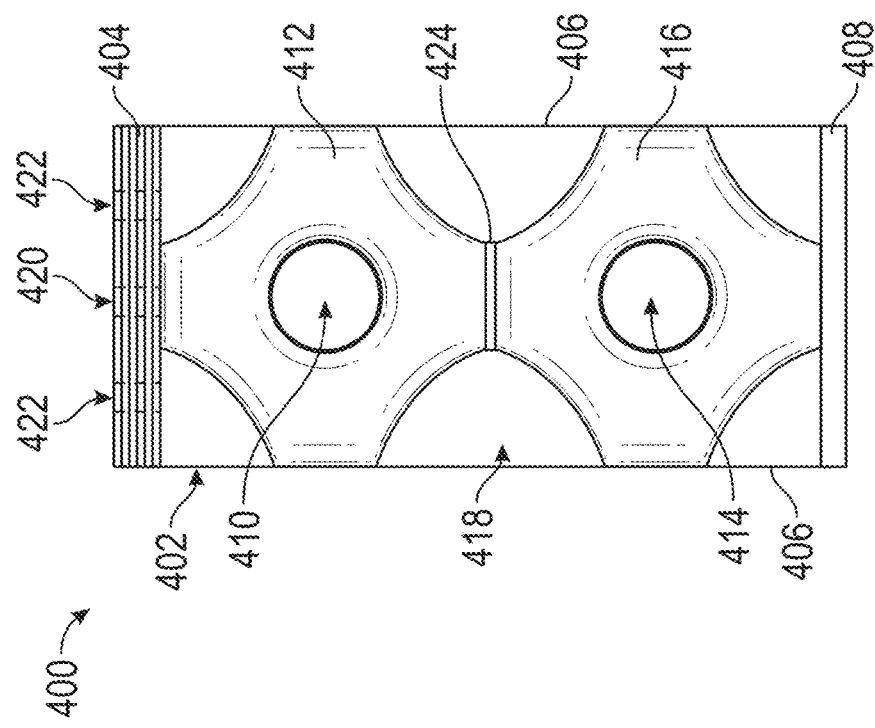
FIG. 4A is a schematic illustration of a resonator acoustic damping element in accordance with an embodiment of the present disclosure.

Referring now to FIGS. 4A-4B, schematic illustrations of a resonator acoustic damping element 400 in accordance with an embodiment of the present disclosure are shown. The resonator acoustic damping element 400 is illustrative of a single node or structure that may be provided in an annular arrangement within a backing cavity and about an inner diameter surface of a housing, such as shown and described with respect to FIGS. 3A-3C. FIG. 4A is a side elevation view of the resonator acoustic damping element 400 and FIG. 4B is an isometric illustration thereof. It will be appreciated that the resonator acoustic damping element 400 is one of a group or set that may be arranged in a circumferential arrangement within a backing cavity of a housing, such as shown and described above.

The resonator acoustic damping element 400 is defined with a resonator housing 402 having an inner wall 404, sidewalls 406, and a backing wall 408. The resonator housing 402 defines an internal volume which may a single resonator or may be subdivided into two or more resonator chambers, as described herein. The inner wall 404 may be part of an inner diameter surface of a housing and may define a perforated wall surface that defines part of a flow path, such as shown and described with respect to FIGS. 3A-3C. In this illustration, the resonator acoustic damping element 400 is arranged with multiple degrees-of-freedom, and thus may be configured to reduce the noise of multiple different tones. In this illustrative configuration, the resonator acoustic damping element 400 has a double-bulb configuration, with a first resonator chamber 410 defined within a first resonator structure 412, a second resonator chamber 414 defined within a second resonator structure 416, and a third resonator chamber 418 defined within the volume of the resonator housing 402 that is between the exterior walls 404, 406, 408 of the resonator housing 402 and external to the first and second resonator structures 412, 416.

To permit sound waves to enter the various resonator chambers 410, 414, 418, the inner wall 404 includes openings 420, 422. A first opening 420 in the inner wall 404 is arranged to provide fluid (e.g., gas) communication from a flow path through the inner wall 404 and into the first resonator chamber 410 defined by the first resonator structure 412. A frequency or range of frequencies may be absorbed within the first resonator chamber 410. A portion of the sound that enters the first resonator chamber 410 may pass through a resonator wall 424 that joins the first resonator structure 412 to the second resonator structure 416. The resonator wall 424 includes at least one opening 426 to permit sound waves to propagate into the second resonator chamber 414 defined within the second resonator structure 416, and thus a second frequency or range of frequencies may be absorbed within the second resonator chamber 414. In some configurations, the second resonator chamber 414 may be arranged to absorb the same frequency or range of frequencies as the first resonator chamber 410, and thus may provide increased damping of a specific frequency or range of frequencies.

As shown, the inner wall 404 includes second openings 422 which provide fluid communication through the inner wall 404 and into the third resonator chamber 418 that is defined by the external surfaces of the resonator structures 412, 416 and the internal surfaces of the exterior walls 404, 406, 408. Accordingly, a third frequency or range of frequencies may be absorbed by the resonator acoustic damping element 400 within the third resonator chamber 418. Although shown with multiple second openings 422, in other embodiments a single second opening 422 may be provided or in other embodiments no second openings 422 may be present, with the sole fluid entrance into the resonator acoustic damping element 400 through a single (or multiple) first openings 420 that open into the first resonator chamber 410. In such a configuration, the sound waves may propagate through the first resonator chamber 410 and then into the second and/or third resonator chambers 414, 418, in sequence or in parallel. Furthermore, although shown with two resonator structures 412, 416 defining three resonator chambers 410, 414, 418, it will be appreciated that a single resonator structure may be provided that defines a single resonator chamber or two resonator chambers. In still other embodiments, more than two resonator structures may be provided, with the option for an additional resonator chamber defined within the resonator housing but external to the surfaces of the resonator structures. Accordingly, it will be appreciated that the configuration of FIGS. 4A-4B is not intended to be limiting.

Referring now to FIGS. 5-6, schematic illustrations of alternative types of resonator acoustic damping elements in accordance with embodiments of the present disclosure are shown. FIG. 5 illustrates a resonator acoustic damping element 500 having two resonator chambers 502, 504 in a first example arrangement and FIG. 6 illustrates a resonator acoustic damping element 600 having two resonator chambers 602, 604 in a second example arrangement. In each case, the resonator acoustic damping elements 500, 600 include an opening 506, 606 that is provided in an inner wall 508, 608 that is exposed to a flow path, similar to that shown and described above. The openings 506, 606 provide a path through which sound waves may enter the respective resonator acoustic damping element 500, 600. The resonator chambers 502, 504, 602, 604 may be configured to absorb or damp one or more specific frequencies of sound, with an opening 510, 610 providing fluid connection between the respective first resonator chamber 502, 602 and the respective second resonator chamber 504, 604. Each of the resonator acoustic damping elements 500, 600 is defined having the inner wall 508, 608 arranged along a flow path, and sidewalls 512, 612 and backing walls 514, 614 are solid walls that contain and define the bounds of the resonator chambers 502, 504, 602, 604.

It will be appreciated that although three examples of types and configurations of resonator type acoustic damping elements are shown in FIGS. 4A-4B, 5, and 6, those of skill in the art will appreciate that other types of chambered acoustic damping elements may be employed without departing from the scope of the present disclosure. Furthermore, it will be appreciated that acoustic dampers in accordance with the present disclosure may incorporate multiple different types of chambered or resonator type acoustic damping elements. Accordingly, a tailored damping scheme may be provided through combining the various types of resonator acoustic damping elements within a single acoustic damper. The resonator acoustic damping elements may be tuned to one or more specific frequencies and may be able to achieve dissipation and/or absorption of sound waves at lower frequencies than with, for example, bulk absorbers. For example, specific tones related to fan blade passage and/or fan RPM may be specifically targeted for dissipation and/or absorption by the resonator acoustic damping elements.

Figure 7A:
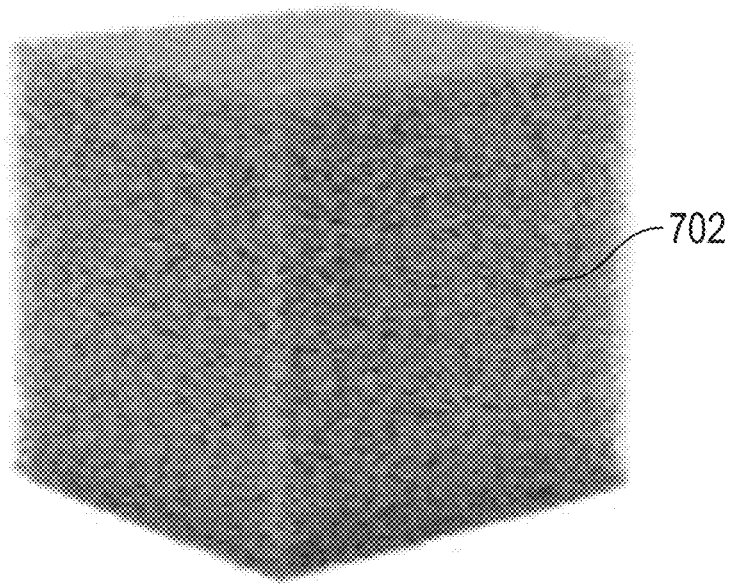
FIG. 7A is a schematic illustration of a foam bulk absorber in accordance with an embodiment of the present disclosure.
Figure 7B:
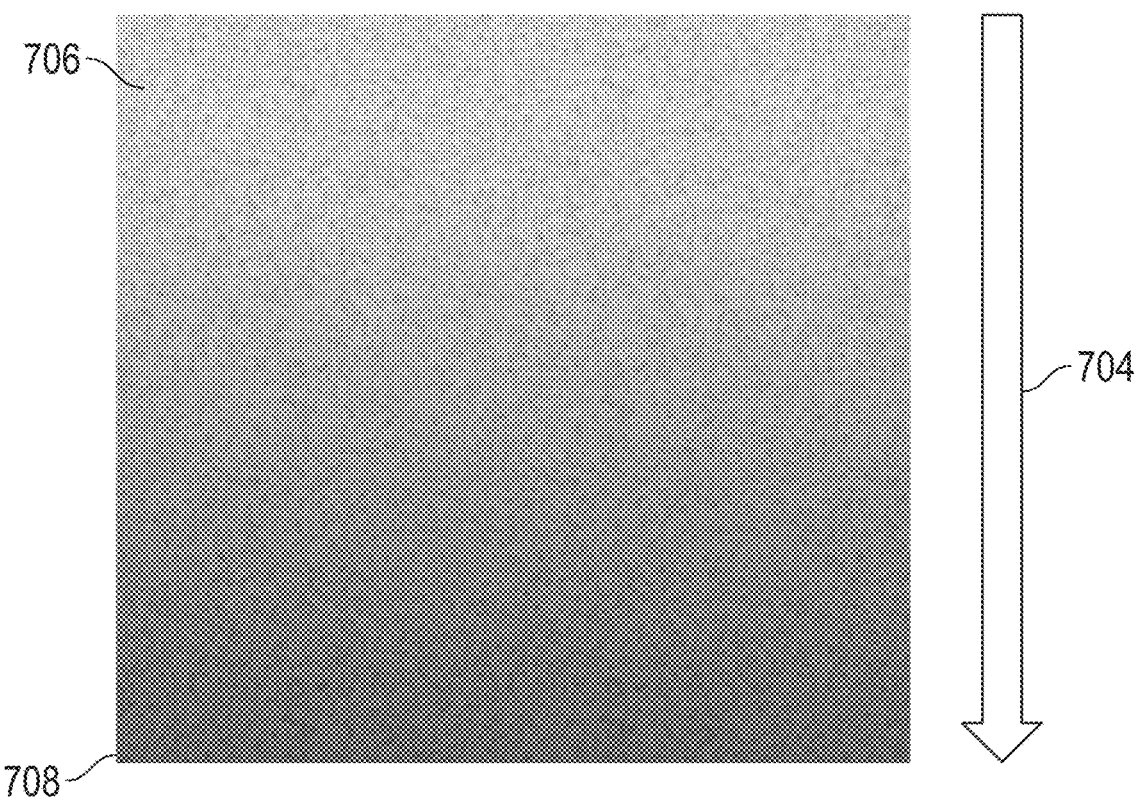
FIG. 7B is an illustration of an alternative configuration of a foam bulk absorber in accordance with an embodiment of the present disclosure.
Figure 8A:
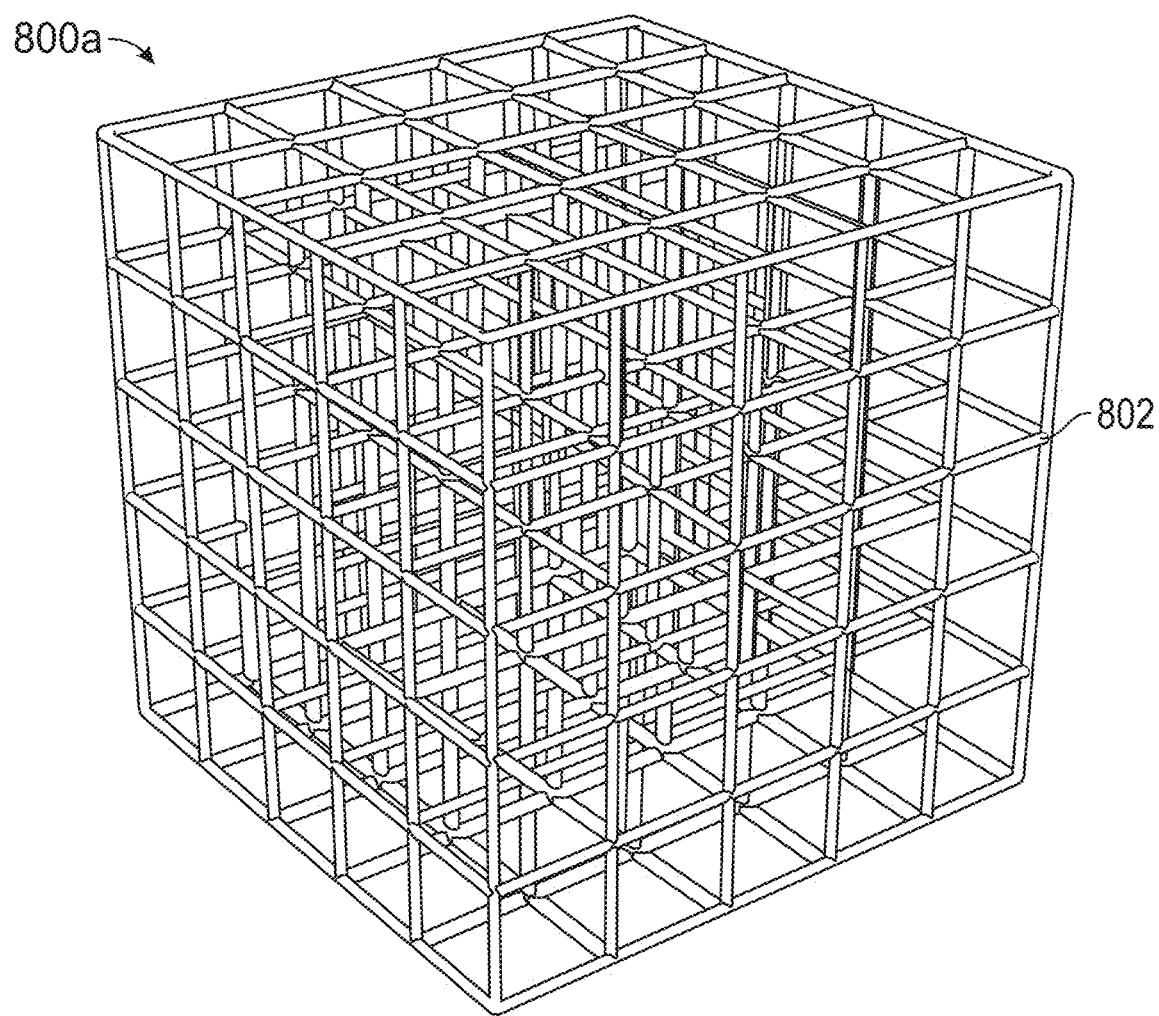
FIG. 8A is a schematic illustration of a lattice bulk absorber in accordance with an embodiment of the present disclosure.
Figure 8B:
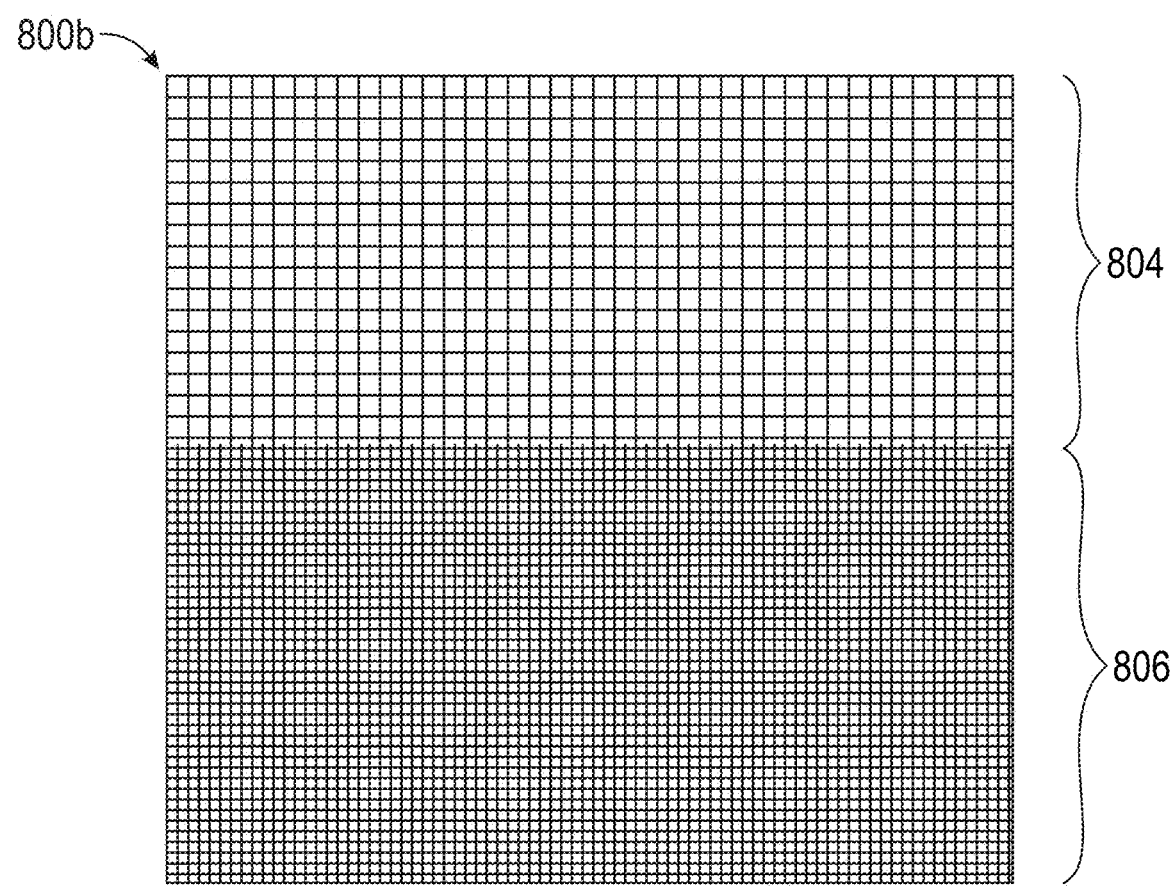
FIG. 8B is an illustration of an alternative configuration of a lattice bulk absorber in accordance with an embodiment of the present disclosure.

Referring now to FIGS. 7A-7B and 8A-8B, schematic illustrations of configurations for bulk absorbers that may be used within acoustic dampers of the present disclosure are shown. FIGS. 7A-7B illustrate configurations of foam-type bulk absorbers and FIGS. 8A-8B illustrate configurations of lattice-type bulk absorbers.

In the configuration of FIG. 7A, a foam bulk absorber acoustic damping element 700*a* is shown having a foam 702 of substantially uniform density. The portion of the bulk absorber acoustic damping element 700*a* that is illustrated in FIG. 7A may represent a discrete acoustic damping element to be installed within a backing cavity, as described above, or may be a slice or portion of an annular or partially annular structure that wraps around an inner surface wall of an acoustic damper, as shown and described above. FIG. 7B illustrates an alternative bulk absorber acoustic damping element 700b having a varying density foam, with the density gradually increasing as indicated by the arrow 704 from a low density end 706 to a high density end 708. The orientation of the more dense end 708 and/or the less dense end 706 end relative to an inner surface wall, and associated openings therein, may be selected based on the specific application, and it is not intended that the directional arrow 704 is indicative of a direction of installation, but rather merely indicates a gradation in the foam density.

In the configuration of FIG. 8A, a lattice bulk absorber acoustic damping element 800a is shown having a substantially uniform lattice structure 802. The portion of the bulk absorber acoustic damping element 800a that is illustrated in FIG. 8A may represent a discrete acoustic damping element to be installed within a backing cavity, as described above, or may be a slice or portion of an annular or partially annular structure that wraps around an inner surface wall of an acoustic damper, as shown and described above. FIG. 8B illustrates an alternative bulk absorber acoustic damping element 800b having a varying density lattice structure. In this illustrative configuration, the bulk absorber acoustic damping element 800b has a low density lattice portion 804 and a high density lattice portion 806. The orientation of the more dense side (806) or less dense side (804) relative to an inner surface wall, and the associated openings, may be selected based on the specific application. The lattice structures may be formed of a micro-lattice with pores having specific sizes to absorb or dissipate sound waves having relatively high frequency.

Although the multiple density lattice structure shown in FIG. 8B illustrates only two different lattice densities in the portions 804, 806, such configuration is not intended to be limiting. In other embodiments, more than two portions or layers of differing lattice density may be employed without departing from the scope of the present disclosure. Moreover, although shown with a substantially square or cubic lattice structure, this geometry is not intended to be limiting. The lattice structure, whether of single lattice density (FIG. 8A) or multiple lattice density (FIG. 8B), may take various other lattice forms, such as, and without limitation, cubic vertex centroid, cubic diamond, cubic fluorite, tetrahedron octahedral edge, tetrahedron octahedral vertex centroid, tetrahedron vertex centroid, or various other configurations as will be appreciated by those of skill in the art. Furthermore, it will be appreciated that a bulk absorber acoustic damping elements may be formed with a combination of lattice and foam materials and/or the bulk absorber acoustic damping elements may be formed by using Triply Periodic Minimal Surface (TPMS) geometry structures such as gyroid and lidinoid, etc. The bulk absorber acoustic damping elements, or portions thereof, may be formed from metals, polymer-based materials, aerogels, foams, gels, or the like, with or without rigid or elastic frames. Examples of rigid frames may be formed from, for example, aluminum, nickel, titanium, polycarbonates, etc., and examples of elastic frames may be formed from, for example, polyurethane, melamine, etc. Additionally, in some configurations, an acoustic damper may incorporate multiple different types of bulk absorbers and/or resonators within a single backing cavity. The bulk absorbers described herein can be conventional or additively manufactured open-cell foam or 3D-printed lattice truss structures that create small "pore" spaces to dissipate/absorb sound energy at relatively high frequencies. The foam and/or lattice structure can be inhomogeneous and may include varying density throughout the structure, as shown and described.

Figure 9:
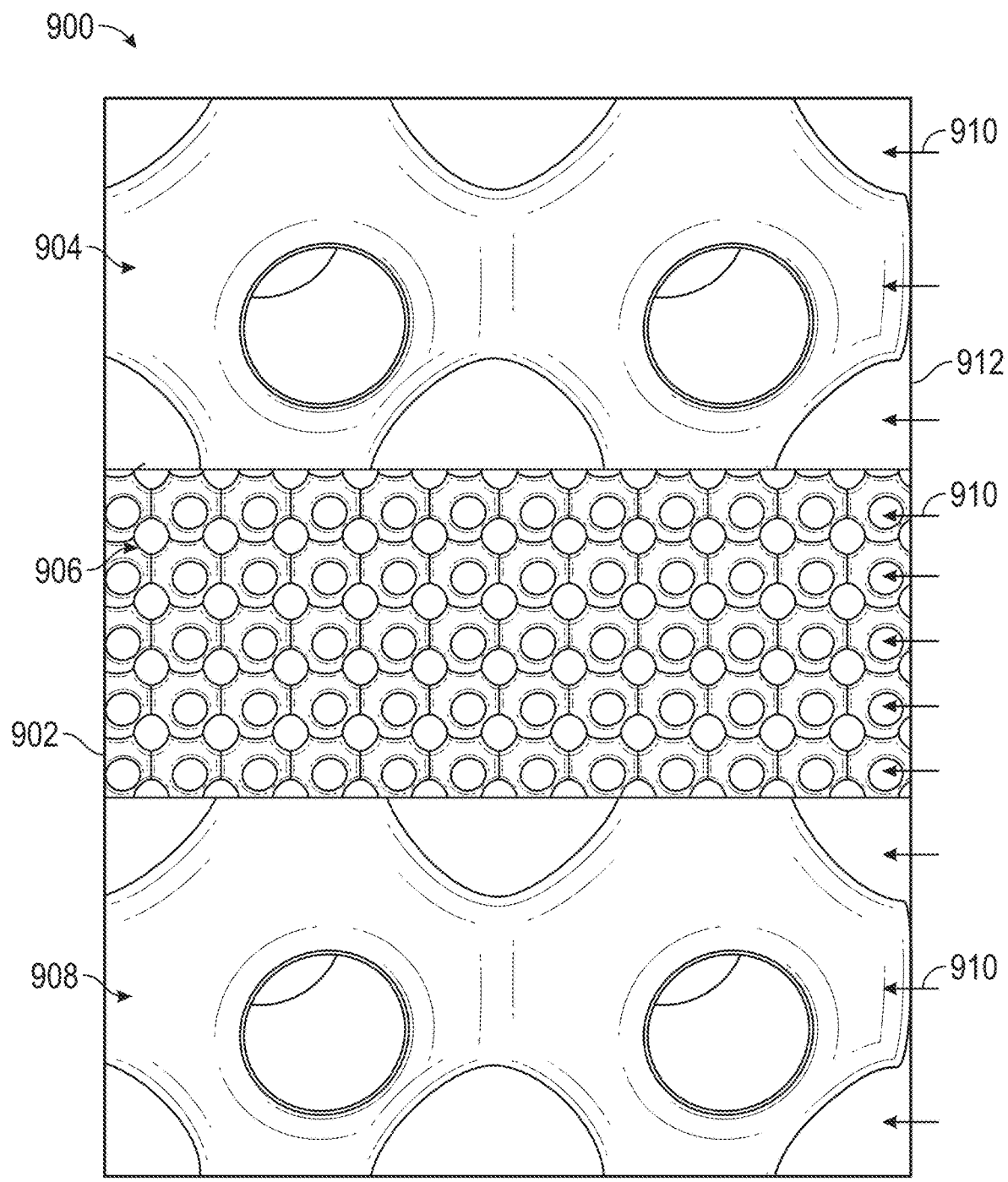
FIG. 9 is an illustration of a part of an acoustic damper in accordance with an embodiment of the present disclosure having resonator structures.

Referring now to FIG. 9, a schematic illustration of a portion of an acoustic damper 900 in accordance with an embodiment of the present disclosure is shown. The illustration of FIG. 9 is a partial cross-section of the acoustic damper 900 and illustrates the internal structure that is contained within a backing cavity and arranged about a flow path, as shown and described above. The acoustic damper 900 includes a resonator assembly that is formed of sets of resonator type acoustic damping elements arranged within a housing 902 of the acoustic damper. The acoustic damper 900 includes a first resonator acoustic damping element 904, a second resonator acoustic damping element 906, and a third resonator acoustic damping element 908. In this illustrative configuration, the first and third resonator acoustic damping elements 904, 908 are configured with a first type (e.g., large bulb) of resonator structures and the second resonator acoustic damping element 906 is configured with a second type (e.g., small bulb) of resonator structures. Sound waves 910 may enter the various resonator acoustic damping elements 904, 906, 908 through openings in an inner surface wall 912 of the acoustic damper 900. The inner surface wall 912 may have various sets of openings to ensure sound enters each of the various sets of resonator structures. For example, the first and third resonator acoustic damping elements 904, 908 may have fewer openings (e.g., similar to that shown in FIG. 4B), as compared to the second resonator acoustic damping element 906, which may include more openings to ensure sound may pass into the higher density but smaller sized resonator structures.

Figure 10:
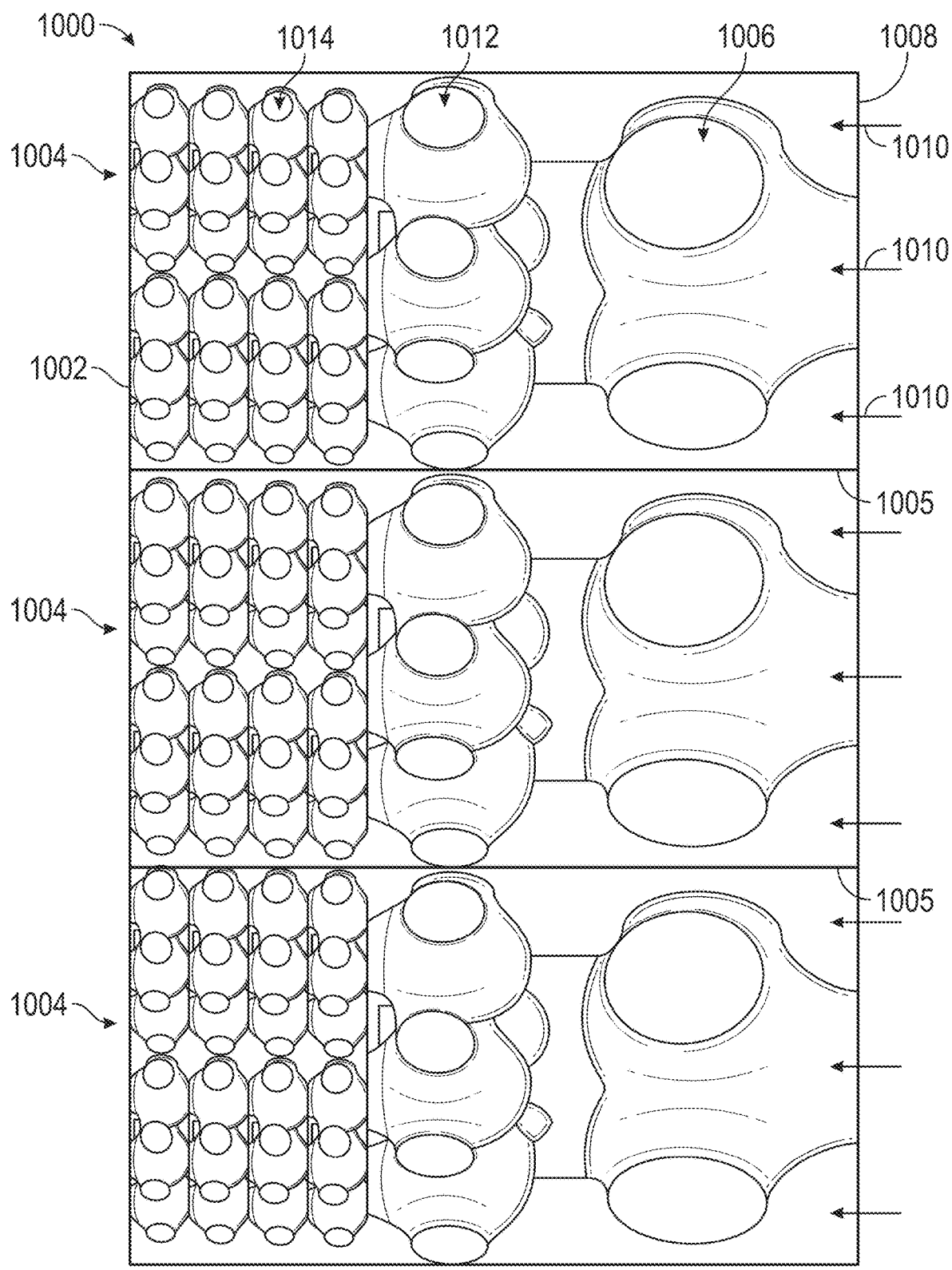
FIG. 10 is an illustration of a part of an acoustic damper in accordance with an embodiment of the present disclosure having an alternative configuration of resonator structures.

As shown in FIG. 9, the different resonator acoustic damping elements 904, 906, 908 are arranged with an axial arrangement, however such configuration is not intended to be limiting. For example, as shown in FIG. 10, an acoustic damper 1000 in accordance with an embodiment of the present disclosure is shown. The acoustic damper 1000 is configured with sets of resonator structures, but rather than being axially different, the resonator structures change in size in a radial direction relative to a flow path defined within a housing 1002 of the acoustic resonator 1000. Furthermore, as illustratively shown, in some configurations, the resonator structures (e.g., bulbs) may be closed, with solid-walled enclosures (e.g., no open sides as shown in FIG. 9). Such a configuration can provide a bulb-like lattice structure similar to a bulk absorber of varying size components (e.g., as shown in FIGS. 7B and 8B). In the illustrative configuration of FIG. 10, each resonator acoustic damping element 1004 includes gradually changing sizes of resonator structures and may be separated from adjacent resonator acoustic damping elements 1004 by partition walls 1005. That is, different scales of the lattice and/or resonator structure can be merged smoothly, using a blending function, such as illustrated in FIG. 10. This configuration may allow for a single resonator/bulk absorber structure with smooth transitions, which could be manufactured using additive manufacturing techniques.

For example, as shown, a first resonator structure 1006 of each resonator acoustic damping element 1004 may be arranged at an inlet side 1008 to receive gas and sound waves 1010. Radially outward therefrom, and away from the inlet side, is a second resonator structure 1012, and radially outward therefrom is a third resonator structure 1014. As shown, the size of the resonator structures 1006, 1012, 1014 decrease as a distance from the inlet side 1008 increases. The transitions from one size of resonator structure to the next may be substantially smooth without abrupt changes. In some configurations, the smaller resonator structures may be arranged at the inlet side, with increasing sizes as radial distance increases. Furthermore, in other embodiments, a mixture of sizes may be provided such that there is no directional orientation (e.g., the first structures 1006 may be arranged between the relatively smaller structures 1012, 1014).

Referring to FIGS. 11-16, schematic illustrations of various arrangements of internal structures of acoustic damping elements in accordance with embodiments of the present disclosure are shown.

Figure 11:
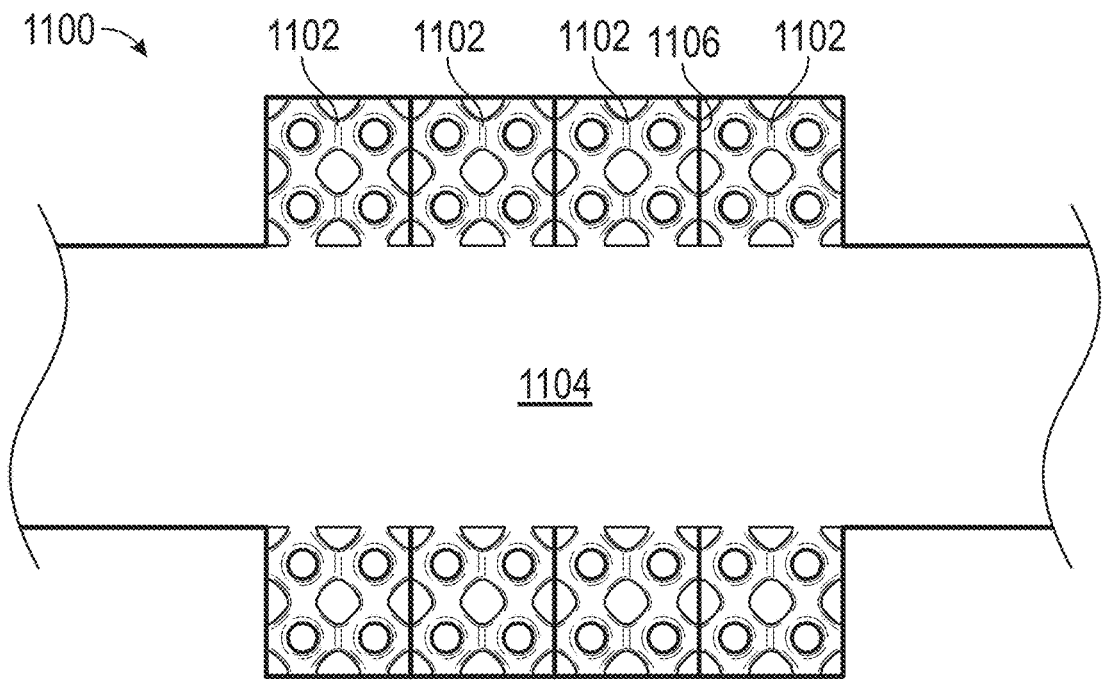
FIG. 11 is a schematic cross-sectional illustration of an acoustic damper in accordance with an embodiment of the present disclosure.

FIG. 11 illustrates an acoustic damper 1100 having distributed resonator elements 1102 arranged in annular rings about the flow path 1104. Each of the resonator elements 1102 may be substantially similar and may be separated by dividing walls 1106. The resonator elements 1102 may be configured similar to the various configurations shown and described above.

Figure 12:
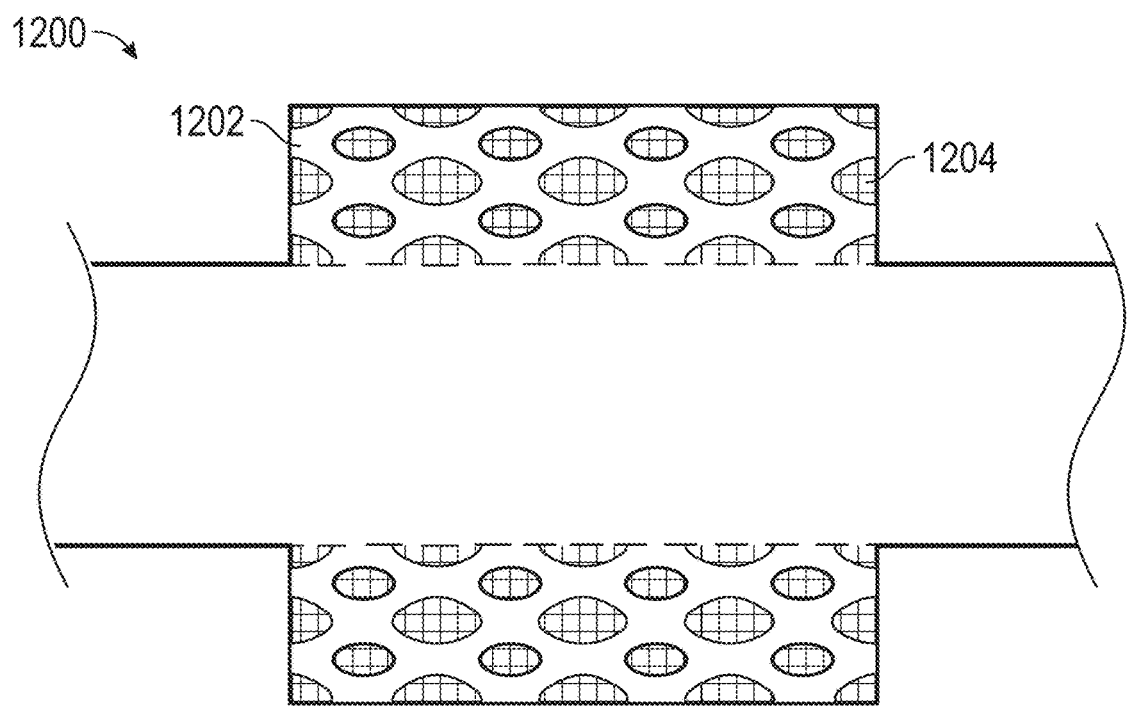
FIG. 12 is a schematic cross-sectional illustration of another acoustic damper in accordance with an embodiment of the present disclosure.

FIG. 12 illustrates an acoustic damper 1200 having resonator structure elements 1202 arranged or embedded within a bulk absorber 1204. The resonator elements 1202 may take various forms including those described above. In this configuration, the bulk absorber 1204 may be of a lattice (FIGS. 8A-8B), foam (FIGS. 7A-7B), or TPMS (e.g., bulb-like structures shown in FIG. 10) type and may fill the space external to the bulb-like structures of the resonator elements 1202 (e.g., third resonator chamber 418 shown in FIG. 4A). Further, as shown in this illustration, a single large backing cavity is filled without subdivisions, as an example of such arrangement of components.

Figure 13:
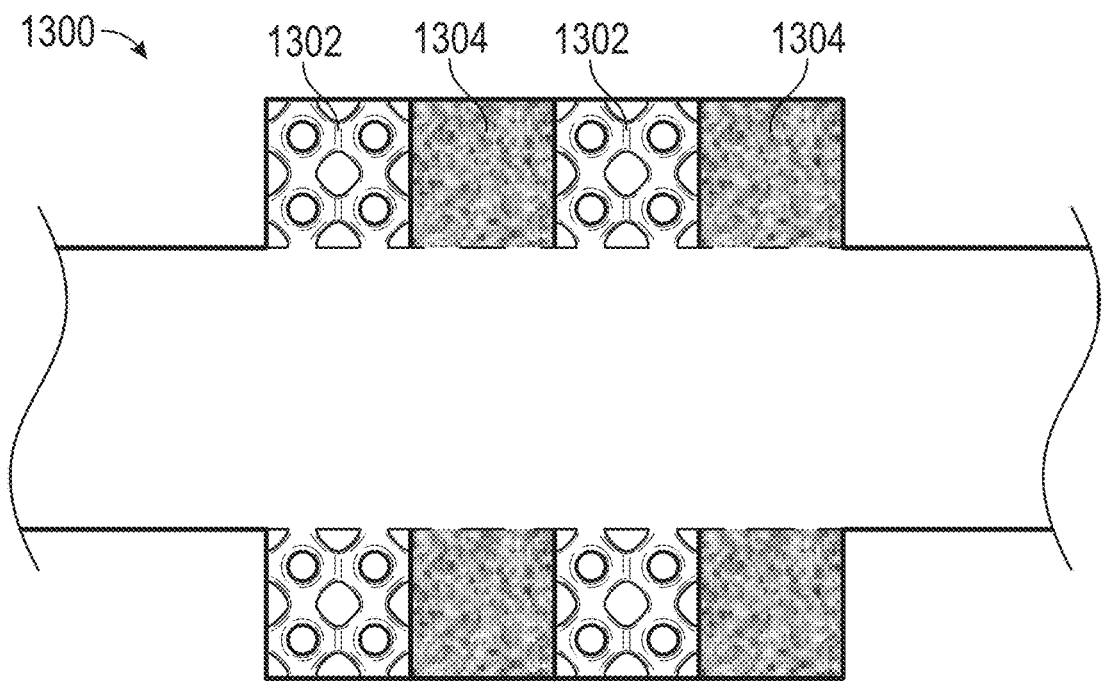
FIG. 13 is a schematic cross-sectional illustration of another acoustic damper in accordance with an embodiment of the present disclosure.

FIG. 13 illustrates an acoustic damper 1300 having resonator elements 1302 and bulk absorbers 1304 arranged in an alternating pattern in an axial direction. It will be appreciated that although only two sets of resonator elements 1302 and bulk absorbers 1304 are illustrated, any number of alternating sets of resonator elements 1302 and bulk absorbers 1304 may be provided to achieve desired noise damping and/or absorption.

Figure 14:
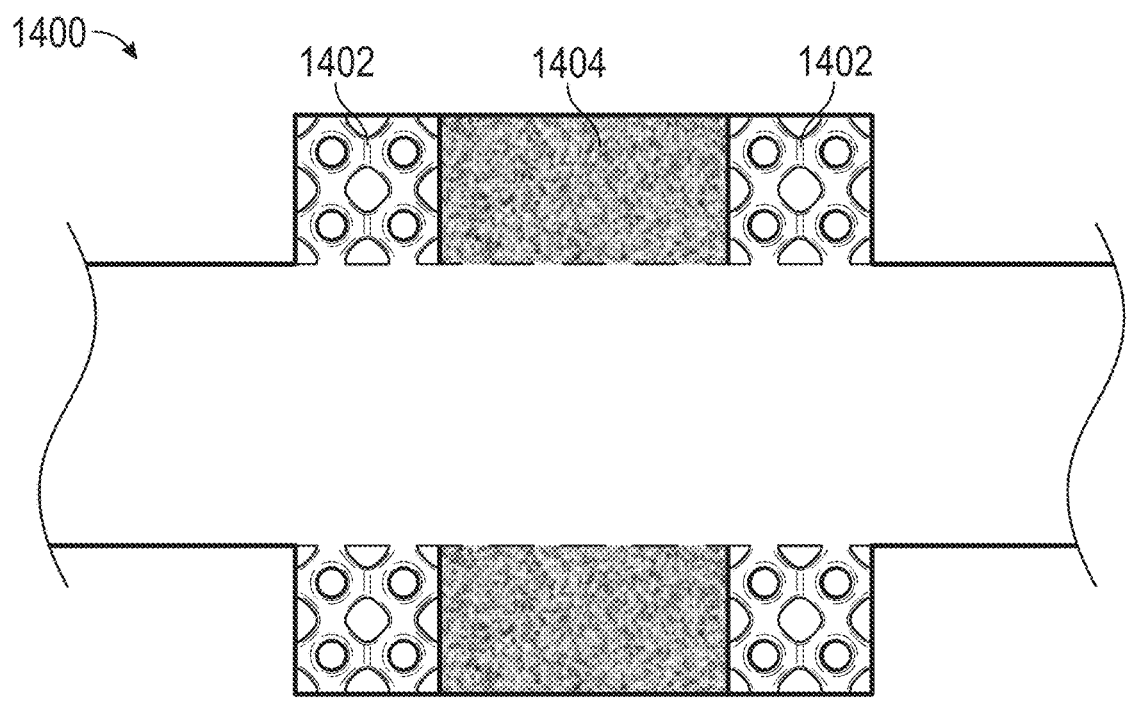
FIG. 14 is a schematic cross-sectional illustration of another acoustic damper in accordance with an embodiment of the present disclosure.

FIG. 14 illustrates an acoustic damper 1400 having resonator elements 1402 and bulk absorbers 1404 arranged with the bulk absorber 1404 arranged axially between the resonator elements 1402. As shown, the bulk absorber 1404 has a longer axial length than the resonator elements 1402. In other configurations, the positions may be reversed, with the bulk absorber 1404 divided into two sections with one or more resonator elements 1402 arranged therebetween.

Figure 15:
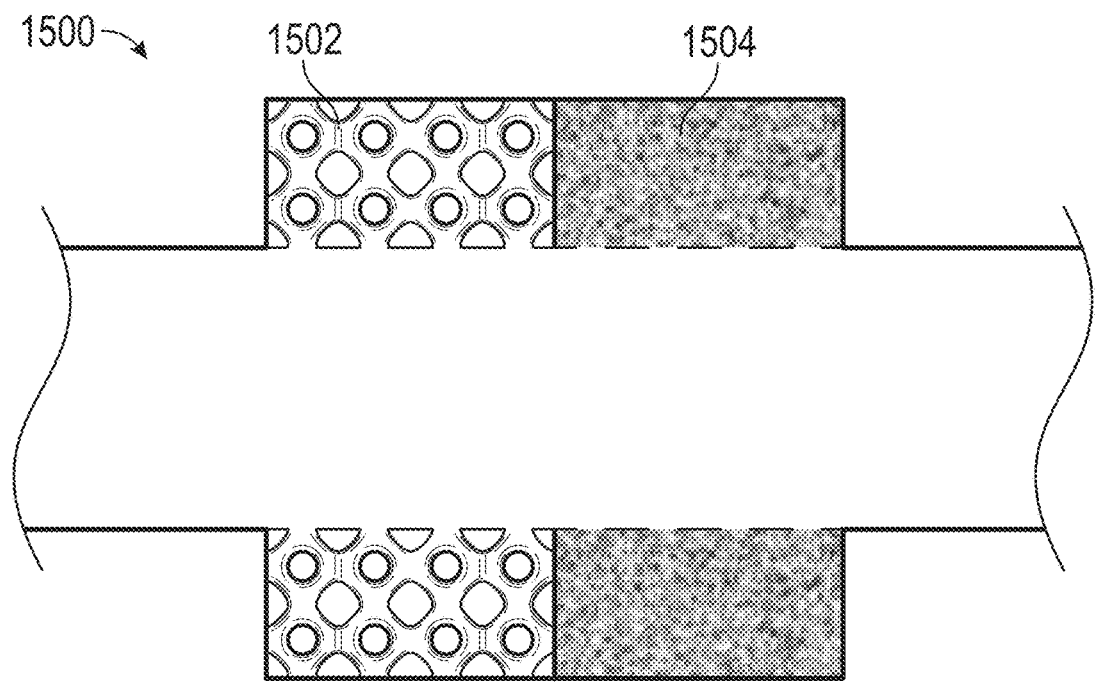
FIG. 15 is a schematic cross-sectional illustration of another acoustic damper in accordance with an embodiment of the present disclosure.

FIG. 15 illustrates an acoustic damper 1500 having resonator elements 1502 and bulk absorbers 1504 arranged axially next to each other. As shown, the bulk absorber 1504 and the resonator elements 1502 have similar axial lengths, although such relationship is not intended to be limiting, and in other embodiments one of the acoustic damping elements may be axially longer than the other. In this configuration, depending on the specific application, the resonator elements 1502 may be arranged upstream relative to the bulk absorbers 1504 (or vice versa).

Figure 16:
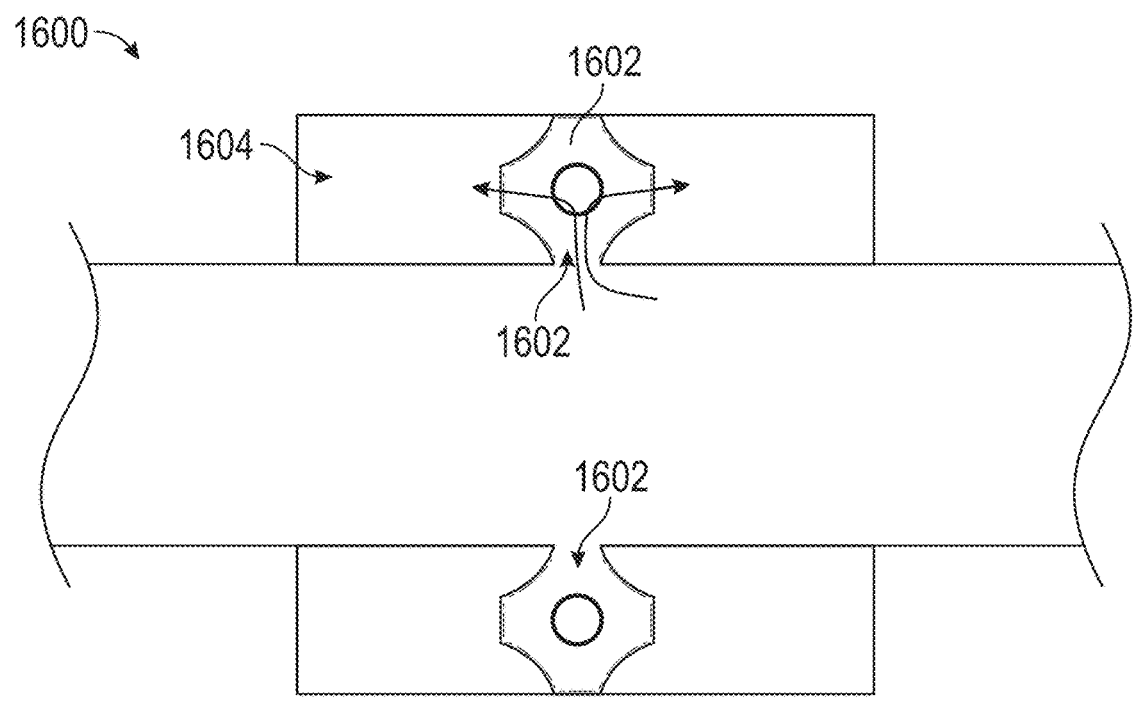
FIG. 16 is a schematic cross-sectional illustration of another acoustic damper in accordance with an embodiment of the present disclosure.

FIG. 16 illustrates an acoustic damper 1600 having an alternative configuration of a resonator element configuration. As shown, a resonator element 1602 is provided within a backing cavity 1604 that extends the full axial length of the acoustic damper 1600. The resonator element 1602 may be defined as a ring of structures about a circumference of an inner surface wall with openings configured to permit sound waves to enter the resonator element 1602 and then the backing cavity 1604. In some such configurations, the backing cavity 1604 may be filled with a bulk absorber (e.g., lattice structure or foam absorber), or may be empty, as illustrated. As shown in FIG. 16, the resonator element 1602 extends the full radial span from the inner diameter surface along the flow path to the outer diameter backing wall. In other configurations, the resonator elements may not extend the full span from inner surface to outer surface. For example, in a non-limiting alternative configuration, a space or gap may be present between an outer diameter end of the resonator element and the backing wall. In such configurations, the outer diameter end may include an opening or hold to allow for fluid communication from within the resonator element and a space radially outward therefrom. Such outer diameter end opening may be used in combination with the axially orientated openings (e.g., shown in FIG. 16) or may be configured as the only opening into the backing cavity from an interior of the resonator element.

Referring to FIGS. 17-20, schematic illustrations of various arrangements of acoustic damper indicating the arrangement of internal features in accordance with embodiments of the present disclosure are shown.

Figure 17:
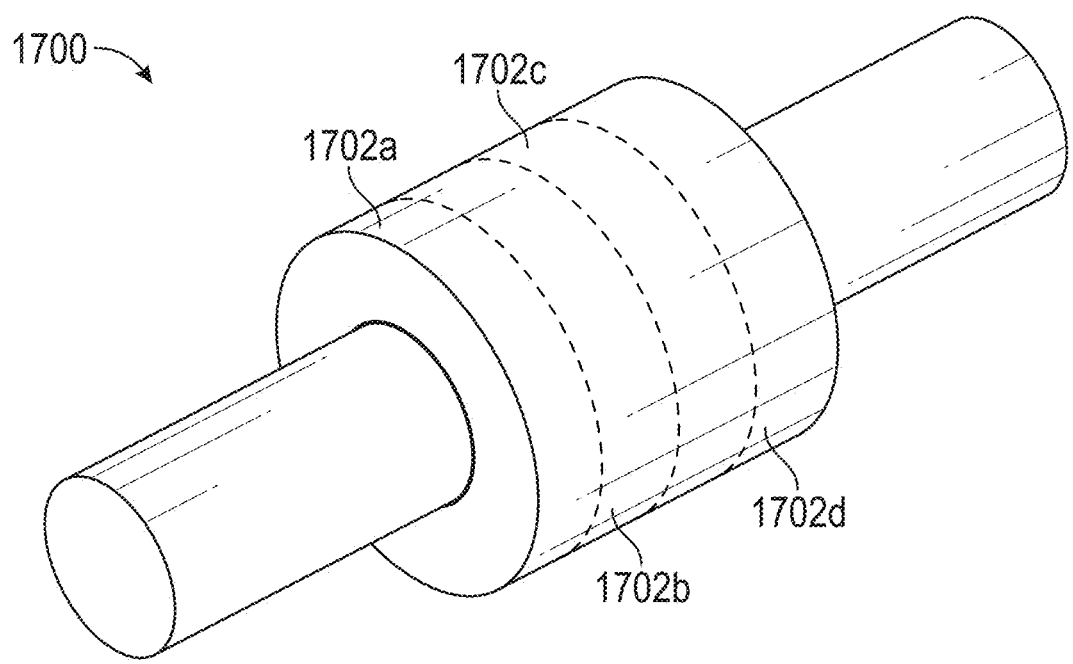
FIG. 17 is a schematic illustration of another acoustic damper illustrating an internal arrangement of components in accordance with an embodiment of the present disclosure.

FIG. 17 illustrates an acoustic damper 1700 having annular rings 1702a-d of acoustic damping elements arranged in an axial pattern. That is, each annular ring 1702a-d includes internal acoustic damping structures, such as resonators and/or bulk absorbers. In some configurations, a first annular ring 1702a may be a bulk absorber, a second annular ring 1702b may be a resonator, a third annular ring 1702c may be a second bulk absorber, and a fourth annular ring 1702d may be a second resonator. The various bulk absorbers and resonators may be configured with any of the above described internal structures or other structures as will be appreciated by those of skill in the art.

Figure 18:
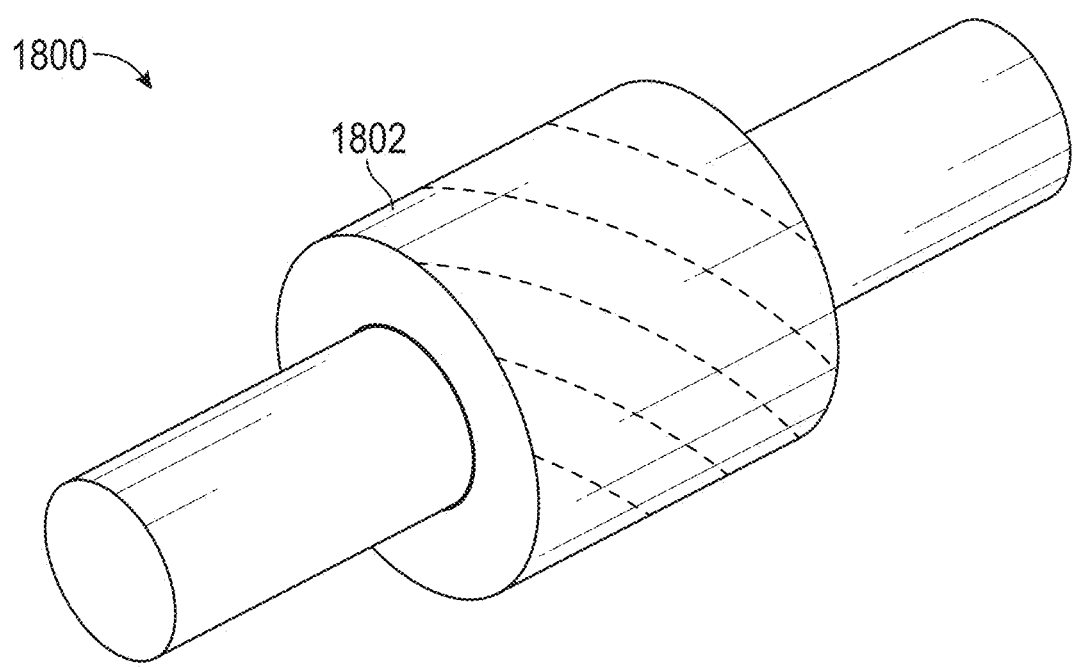
FIG. 18 is a schematic illustration of another acoustic damper illustrating an internal arrangement of components in accordance with an embodiment of the present disclosure.
Figure 19:
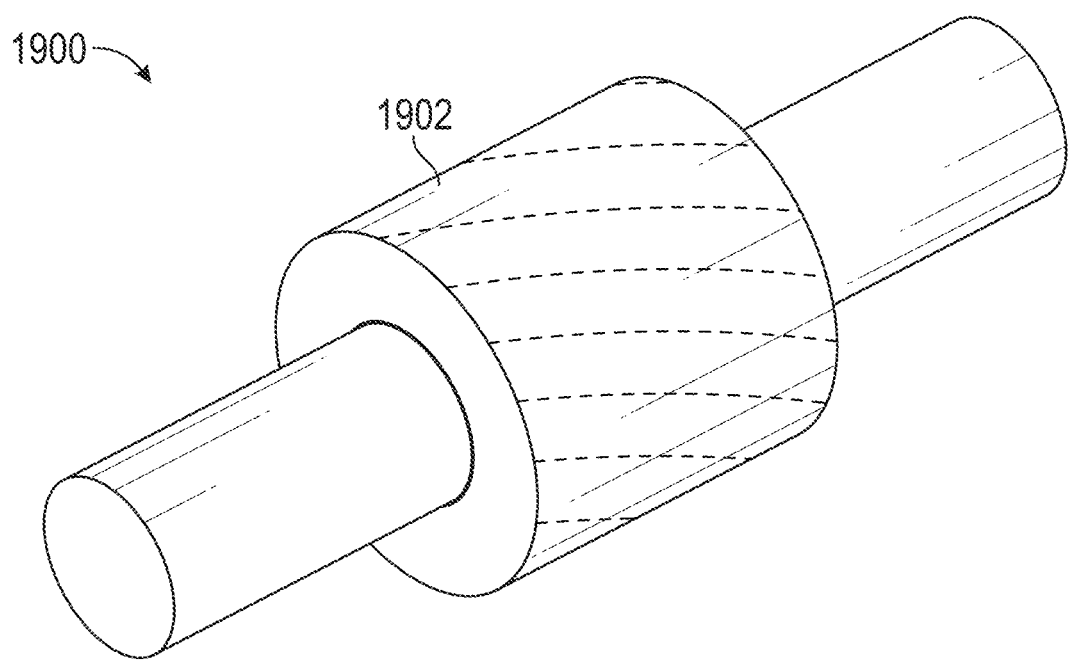
FIG. 19 is a schematic illustration of another acoustic damper illustrating an internal arrangement of components in accordance with an embodiment of the present disclosure.
Figure 20:
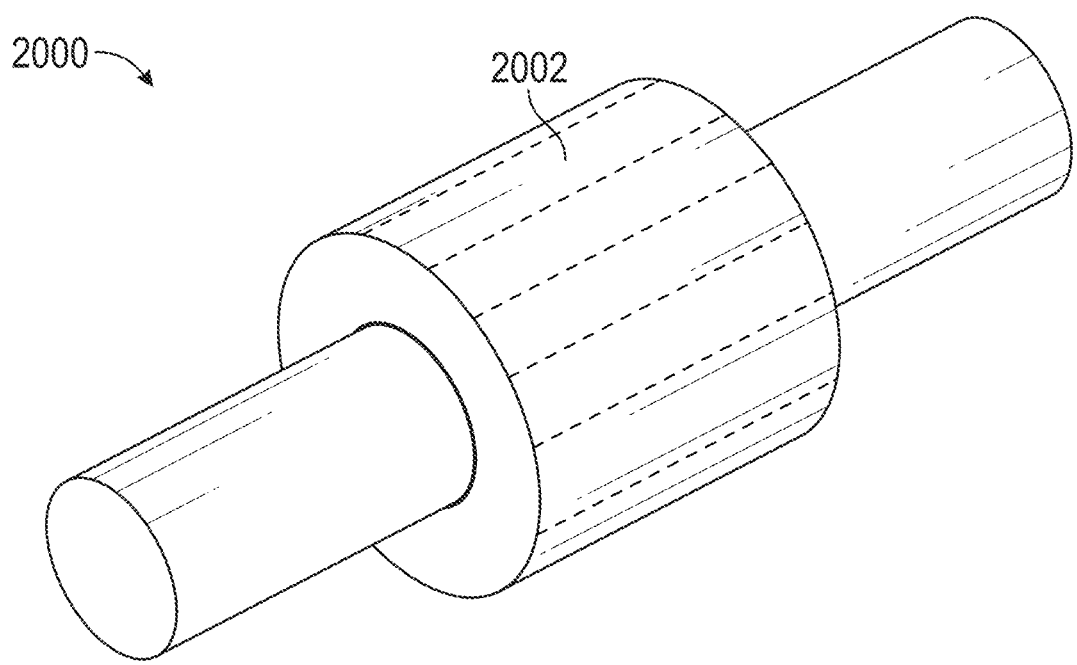
FIG. 20 is a schematic illustration of another acoustic damper illustrating an internal arrangement of components in accordance with an embodiment of the present disclosure.

Although shown in a ring-like stack, such arrangement is not to be limiting. That is, the orientation of the acoustic damping structures is not limited to annular or ring-like, but rather may be angled relative to a direction of flow through a central flow path within the acoustic damper. FIGS. 18-19 illustrate acoustic dampers 1800, 1900 having axially extending acoustic damping structures 1802, 1902, which may also incorporate an alternating pattern of internal structures (e.g., bulk absorbers and resonators). FIG. 20 illustrates the extreme case of an acoustic damper 2000 having an axial orientation of acoustic damping structures 2002, such that each acoustic damping structure 2002 extends from an inlet side to an outlet side, rather than circumferentially about the central flow path. In addition to the substantially continuous acoustic damping structures shown in FIGS. 17-20, it will be appreciated that a checkerboard, segmented, or other discrete element configuration may be employed. In such configurations, different treatments (i.e., individual acoustic damping elements) may be arranged in an alternating fashion. That is, for example, the separating lines illustratively shown in FIGS. 17 and 20 may be combined to form a checkerboard pattern, with each block being representative of a different acoustic damping structure or element.

Figure 21:
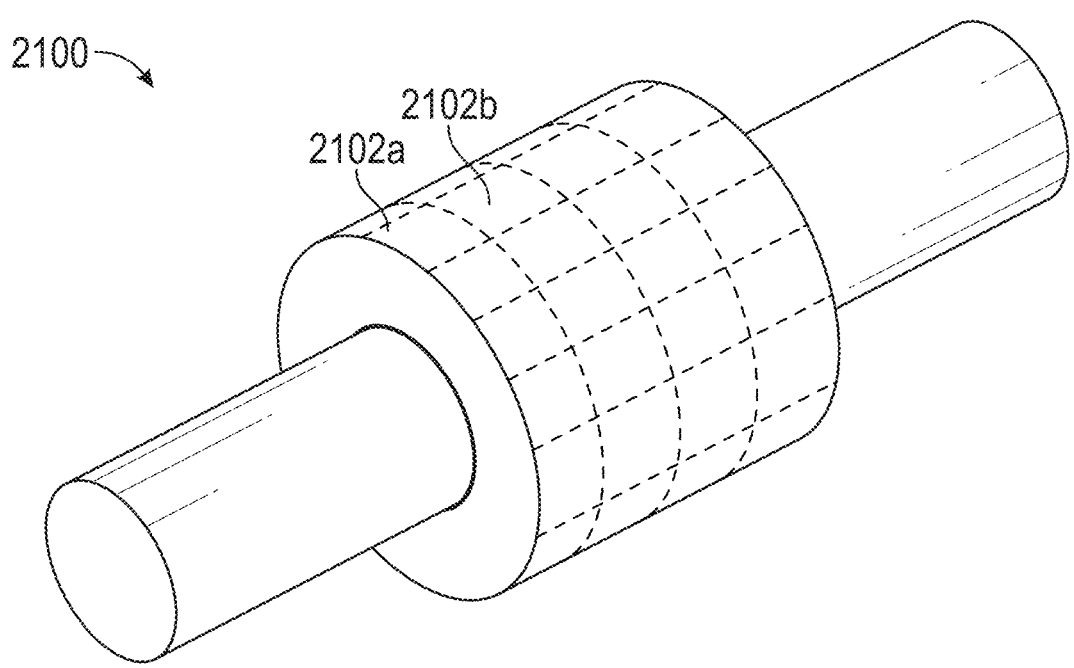
FIG. 21 is a schematic illustration of another acoustic damper illustrating an internal arrangement of components in accordance with an embodiment of the present disclosure.

For example, referring to FIG. 21, an acoustic damper 2100 having a checkerboard-type of arrangement of acoustic damping elements 2102a, 2102b arranged within the housing of the acoustic damper 2100. The acoustic damping elements 2102a, 2102b may be different types of acoustic damping elements. For example, a first acoustic damping element 2102a may have a bulk absorber configuration whereas a second acoustic damping element 2102b may be configured as a resonator. The checkerboard configuration may provide for a pattern or arrangement of different types of acoustic damping elements arranged within the housing to achieve a desired acoustic damping scheme. It will be appreciated that other various arrangements may be employed without departing from the scope of the present disclosure.

Figure 22A:
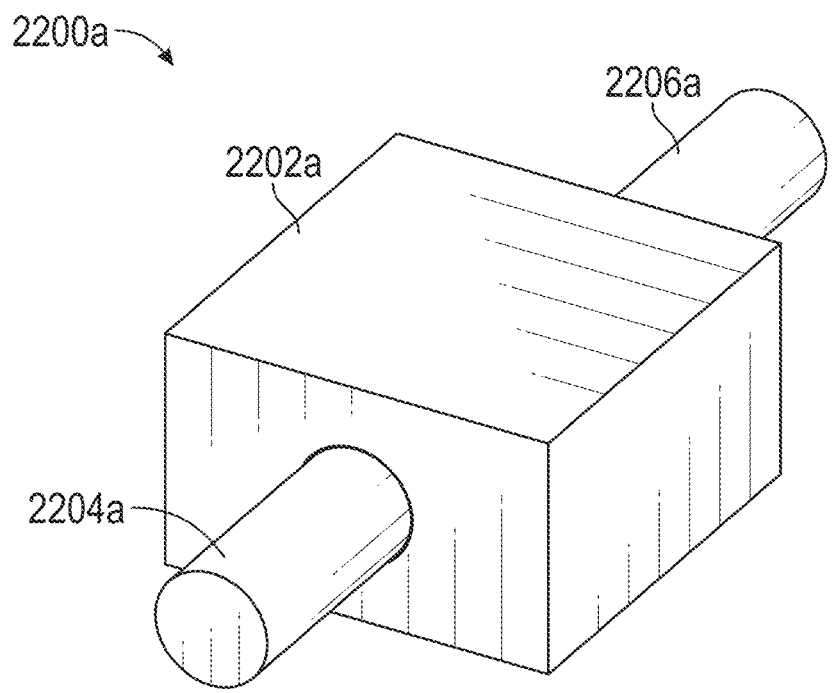
FIG. 22A is a schematic illustration of acoustic damper in accordance with and embodiment of the present disclosure illustrating a housing configuration.
Figure 22B:
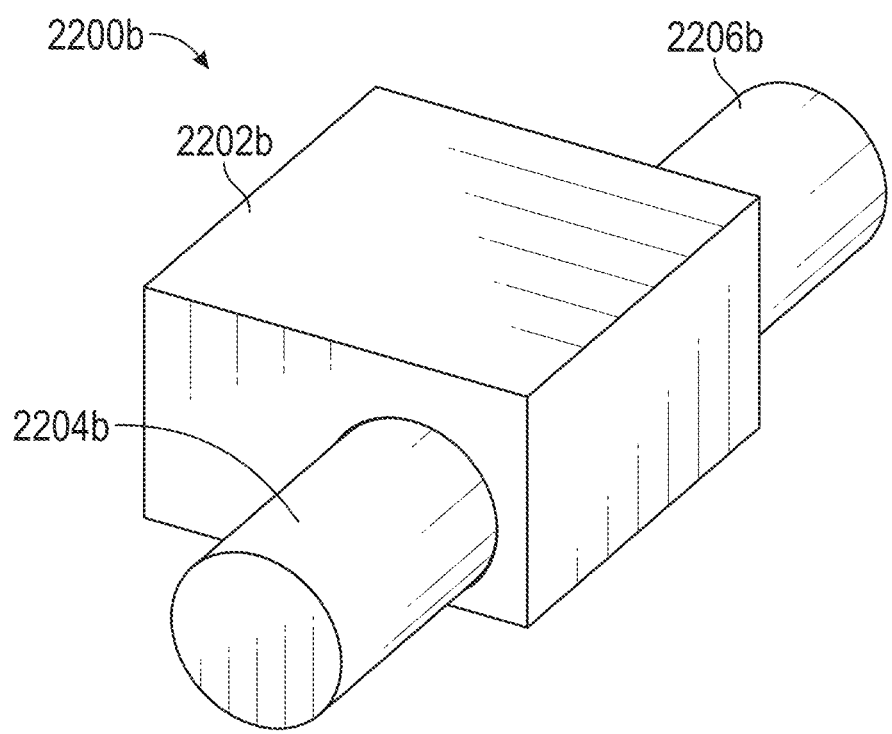
FIG. 22B is a schematic illustration of acoustic damper in accordance with and embodiment of the present disclosure illustrating another housing configuration.

Referring now to FIGS. 22A-22B, schematic illustrations of different housing configurations of acoustic dampers in accordance with embodiments of the present disclosure are shown. In the prior illustrated configurations, the housing of the acoustic dampers has been substantially circular in cross-section, a cylindrical in shape (e.g., pipe-like). However, such circular or cylindrical configuration is not intended to be limiting. For example, as shown in FIGS. 22A-22B, acoustic dampers 2200a, 2200b are shown with box-like housings 2202a, 2202b (e.g., square or rectangular side walls). In FIG. 22A, an acoustic damper 2200a has a cubic or box shape housing 2202a that is arranged along a section of pipe having an inlet section 2204a and an outlet section 2206a. Similarly, in FIG. 22B, an acoustic damper 2200b has a cubic or box shape housing 2202b that is arranged along a section of pipe having an inlet section 2204b and an outlet section 2206b. Within the box-like housing 2202a, 2202b, the acoustic dampers 2200a, 2200b may include various acoustic damping elements and/or structures as shown and described above, having various arrangements axially, circumferentially, and/or individually (e.g., checkerboard). The primary difference between the configurations shown in FIGS. 22A-22B is that the housing 2202a of the acoustic damper 2200a of FIG. 22A is center-aligned with the sections of pipe 2204a, 2206a. In contrast, the housing 2202b of the acoustic damper 2200b of FIG. 22B is offset with respect to the sections of pipe 2204b, 2206b. The arrangement of the housing (and internal structures thereof) may be dictated by various factors, including the space, volume, room, or arrangement of components to which the acoustic dampers are attached. Furthermore, although shown with a substantially straight section of piping, it will be appreciated that the acoustic dampers of the present disclosure may be installed on any section of piping, including bent pipes, at joints, or joins between sections of pipe, or the like, without departing from the scope of the present disclosure.

As shown and described herein, acoustic dampers having a variety of internal structures may be provided and integrated into a life support system to ensure damping, absorption, and/or dissipation of sounds generated by the life support system. In particular, fan noise can contain spinning modes in addition to a plan wave mode propagating in the duct. As such, in some embodiments, the acoustic damping elements and structures may be arranged on a helical path inside the backing cavity and may be aligned with a direction of the spinning mode(s). In more general terms, the resonators and bulk absorbers can have any circumferential arrangement as shown in the various embodiments described above.

Advantageously, embodiments of the present disclosure provide for improved noise damping within life support systems. For example, as shown and described herein, a pipe, tube, or conduit of a life support system may be modified to include an acoustic damper. The acoustic damper may be customized to reduce noise through dissipation, absorption, or the like, and may be configured to absorb one or more specific frequencies or frequency ranges. Advantageously, embodiments of the present disclosure can provide for improved compactness, as compared to conventional acoustic dampers, by providing the ability to target low frequencies in space-limited applications (e.g., within a life support system for use in space). Moreover, advantageously, embodiments of the present disclosure provide for tunability of the noise damping and may provide a broad scope of degrees of freedom for tuning to source noise spectrum shape, and thus may enable damping of intended frequencies without requiring extra material that may not provide intended noise damping.

Furthermore, the inclusion of resonators within the acoustic dampers can enable targeting of specific single frequencies. This, in combination with bulk absorbers, can provide a broad attenuation frequency range. That is, a tailored acoustic damping solution is provided through the customizability achieved with embodiments of the present disclosure. Further, because the acoustic dampers of the present disclosure may be incorporated directly into the piping of a life support system, the use of additive manufacturing techniques can provide the ability to print an insert which may be installed within a housing or may be manufactured directly with the housing itself. Such manufacturing can avoid debonding of a face-sheet (e.g., inner diameter surface) and may reduce fatiguing issues associated with conventional manufacturing processes (e.g., welding, brazing, etc.). Additionally, embodiments of the present disclosure can provide full control over spatial distribution and sizing of resonators and bulk absorbers/lattice arrays cells, to tailor them to meet different noise/sound requirements.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms "about" and "substantially" are intended to include the degree of error associated with measurement of the particular quantity based upon the equipment available at the time of filing the application. For example, the terms may include a range of +8% of a given value or other percentage change as will be appreciated by those of skill in the art for the particular measurement and/or dimensions referred to herein.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description but is only limited by the scope of the appended claims.

What is claimed is:

1. A life support system comprising:
   a pressure garment;
   a helmet; and
   a life support system enclosure, wherein the pressure garment, the helmet, and the life support system enclosure define an enclosed environment, wherein the life support system enclosure includes one or more life support components configured to provide gas for breathing within the enclosed environment, and the gas is directed along a closed-loop cycle flow path through the helmet, the pressure garment, and the life support components, the life support components comprising:
- a fan for driving a flow of the gas through the closed-loop cycle flow path; and
- an acoustic damper arranged along the flow path and configured to reduce noise generated by the fan, the acoustic damper comprising:
  - a housing defining an annular cavity arranged about a portion of the flow path, wherein the housing has a solid exterior surface and an inner diameter surface that comprises one or more openings to fluidly connect the flow path with the annular cavity; and
  - at least one acoustic damping element arranged within the annular cavity, wherein the at least one acoustic damping element comprises at least one resonator acoustic damping element and at least one bulk absorber, wherein the at least one resonator acoustic damping element is configured as a ring-like structure within the annular cavity and the at least one bulk absorber is configured as a ring-like structure within the annular cavity.

2. The life support system of claim 1, wherein the at least one resonator acoustic damping element comprises at least two resonator acoustic damping elements and the at least one bulk absorber comprises at least two bulk absorbers.

3. The life support system of claim 2, wherein the at least two resonator acoustic damping elements and the at least two bulk absorbers are arranged in an alternating pattern in an axial direction within the backing cavity.

4. The life support system of claim 1, wherein the at least one bulk absorber comprises a foam or a gel material.

5. The life support system of claim 4, wherein the material of the bulk absorber comprises a varying density foam or varying density gel.

6. The life support system of claim 1, wherein the at least one bulk absorber comprises a lattice structure.

7. The life support system of claim 6, wherein the lattice structure comprises a varying density lattice structure.

8. The life support system of claim 1, wherein the at least one bulk absorber comprises a Triply Periodic Minimal Surface (TPMS) geometry structure.

9. The life support system of claim 1, wherein the at least one resonator acoustic damping element comprises is part of a resonator assembly arranged within the backing cavity.

10. The life support system of claim 9, wherein the resonator assembly comprises the at least one resonator acoustic damping element as an at least one first resonator acoustic damping element, the resonator assembly further comprising at least one second resonator acoustic damping element having a different density than the at least one first resonator acoustic damping element.

11. The life support system of claim 9, wherein the resonator assembly comprises resonator housing, a first resonator chamber defined within a first resonator structure, a second resonator chamber defined within a second resonator structure, and a third resonator chamber defined within a volume of the resonator housing that is defined within the resonator housing between walls of the resonator housing and external surfaces of the first and second resonator structures.

12. The life support system of claim 11, wherein the at least one opening comprises a first opening fluidly connecting the flow path to the first resonator chamber and at least one second opening fluidly connecting the flow path to the third resonator chamber.

13. The life support system of claim 1, wherein the one or more openings comprise a first opening arranged to fluidly connect the flow path to the at least one resonator acoustic damping element and a second opening arranged to fluidly connect the flow path to the at least one bulk absorber.

14. The life support system of claim 1, wherein the at least one acoustic damping element is part of a set of acoustic damping structures arranged about the flow path within the backing cavity.

15. The life support system of claim 14, wherein the set of acoustic damping structures are arranged in annular rings about the flow path within the backing cavity.

16. The life support system of claim 14, wherein the set of acoustic damping structures are arranged with an orientation that extends at least partially in a flow direction of the gas through the flow path.

17. The life support system of claim 16, wherein the set of acoustic damping elements are arranged parallel to the flow direction of the gas through the flow path.

18. The life support system of claim 1, wherein the life support components comprise a rapid cycle amine (RCA) system, an acoustic damper, a heat exchanger, an ammonia scrubber, and a vent inlet plenum arranged along the flow path.

\* \* \* \* \*